United States Patent
Switkes et al.

(10) Patent No.: US 10,732,645 B2
(45) Date of Patent: Aug. 4, 2020

(54) METHODS AND SYSTEMS FOR SEMI-AUTONOMOUS VEHICULAR CONVOYS

(71) Applicant: Peloton Technology, Inc., Mountain View, CA (US)

(72) Inventors: Joshua P. Switkes, Mountain View, CA (US); Joseph Christian Gerdes, Los Altos, CA (US)

(73) Assignee: Peloton Technology, Inc., Mountain View, CA (US)

( * ) Notice: Subject to any disclaimer, the term of this patent is extended or adjusted under 35 U.S.C. 154(b) by 0 days.

(21) Appl. No.: 16/188,872

(22) Filed: Nov. 13, 2018

(65) Prior Publication Data

US 2019/0086935 A1 Mar. 21, 2019
US 2019/0361465 A9 Nov. 28, 2019

Related U.S. Application Data

(60) Continuation of application No. 16/028,307, filed on Jul. 5, 2018, now Pat. No. 10,162,366, which is a
(Continued)

(51) Int. Cl.
*G05D 1/02* (2020.01)
*G08G 1/16* (2006.01)
(Continued)

(52) U.S. Cl.
CPC ........... *G05D 1/0295* (2013.01); *G01C 22/00* (2013.01); *G01S 13/931* (2013.01);
(Continued)

(58) Field of Classification Search
CPC .. G05D 1/0295; G05D 1/0217; G05D 1/0293; G05D 1/0297; G01C 22/00;
(Continued)

(56) References Cited

U.S. PATENT DOCUMENTS 3,725,921 A 4/1973 Yee et al.
4,317,117 A 2/1982 Chasek
(Continued)

FOREIGN PATENT DOCUMENTS

DE 102007058192 A1 6/2009
DE 102011002275 A1 10/2012
(Continued)

OTHER PUBLICATIONS

Al Alam, Assad et al. "An Experimental Study on the Fuel Reduction Potential of Heavy Duty Vehicle Platooning", J010 13th International IEEE Annual Conference on Intelligent Transportation Systems, Sep. 2010, pp. 306-311.
(Continued)

*Primary Examiner* — Hussein Elchanti
(74) *Attorney, Agent, or Firm* — Redbrick IP, P.C.

(57) ABSTRACT

The present invention relates to a method and system for enabling vehicles to closely follow one another through partial automation. Following closely behind another vehicle can have significant fuel savings benefits, but is unsafe when done manually by the driver. By directly commanding the engine torque and braking of the following vehicle while controlling the gap between vehicles using a sensor system, and additionally using a communication link between vehicles that allows information about vehicle actions, such as braking events, to be anticipated by the following vehicle, a Semi-Autonomous Vehicular Convoying System that enables vehicles to follow closely together in a safe, efficient and convenient manner may be achieved.

29 Claims, 14 Drawing Sheets

Related U.S. Application Data continuation of application No. 15/817,038, filed on Nov. 17, 2017, now Pat. No. 10,042,365, which is a continuation of application No. 15/607,316, filed on May 26, 2017, now Pat. No. 10,281,927, which is a continuation of application No. 14/292,583, filed on May 30, 2014, now Pat. No. 9,665,102, which is a division of application No. 13/542,622, filed on Jul. 5, 2012, now Pat. No. 8,744,666, and a division of application No. 13/542,627, filed on Jul. 5, 2012, now Pat. No. 9,582,006.

(60) Provisional application No. 61/505,076, filed on Jul. 6, 2011.

(51) Int. Cl.

| | | |
|---|---|---|
| *G08G 1/00* | (2006.01) | |
| *G01C 22/00* | (2006.01) | |
| *G01S 13/92* | (2006.01) | |
| *G01S 13/931* | (2020.01) | |
| *G01C 23/00* | (2006.01) | |
| *G01S 13/93* | (2020.01) | |

(52) U.S. Cl.
CPC ......... *G05D 1/0217* (2013.01); *G05D 1/0293* (2013.01); *G05D 1/0297* (2013.01); *G08G 1/166* (2013.01); *G08G 1/167* (2013.01); *G08G 1/202* (2013.01); *G08G 1/22* (2013.01); *G01C 23/00* (2013.01); *G01S 13/92* (2013.01); *G01S 13/93* (2013.01); *G05D 2201/0213* (2013.01)

(58) Field of Classification Search
CPC ...... G01S 13/931; G08G 1/166; G08G 1/167; G08G 1/202; G08G 1/22
See application file for complete search history.

(56) References Cited

U.S. PATENT DOCUMENTS

| | | | |
|---|---|---|---|
| 4,370,718 | A | 1/1983 | Chasek |
| 5,166,881 | A | 11/1992 | Akasu |
| 5,295,551 | A | 3/1994 | Sukonick |
| 5,331,561 | A | 7/1994 | Barrett et al. |
| 5,484,078 | A | 1/1996 | Bronovicki |
| 5,572,449 | A | 11/1996 | Tang et al. |
| 5,633,456 | A | 5/1997 | Stander |
| 5,680,122 | A | 10/1997 | Mio |
| 5,777,451 | A | 7/1998 | Kobayashi et al. |
| 5,781,119 | A | 7/1998 | Yamashita et al. |
| 5,800,958 | A | 9/1998 | Manteghi |
| 5,815,825 | A | 9/1998 | Tachibana et al. |
| 6,032,097 | A | 2/2000 | Lihoshi |
| 6,125,321 | A | 9/2000 | Tabata |
| 6,128,559 | A | 10/2000 | Saitou et al. |
| 6,188,950 | B1 | 2/2001 | Tsutsumi et al. |
| 6,265,990 | B1 | 7/2001 | Isogai et al. |
| 6,285,929 | B1 | 9/2001 | Hashimoto |
| 6,314,366 | B1 | 11/2001 | Farmakis et al. |
| 6,345,603 | B1 | 2/2002 | Abboud et al. |
| 6,356,820 | B1 | 3/2002 | Hashimoto et al. |
| 6,370,471 | B1 | 4/2002 | Lohner et al. |
| 6,370,475 | B1 | 4/2002 | Breed et al. |
| 6,397,149 | B1 | 5/2002 | Hashimoto |
| 6,418,370 | B1 | 7/2002 | Isogai et al. |
| 6,484,078 | B1 | 11/2002 | Kageyama |
| 6,510,381 | B2 | 1/2003 | Grounds et al. |
| 6,604,038 | B1 | 8/2003 | Lesesky et al. |
| 6,633,006 | B1 | 10/2003 | Wolf et al. |
| 6,765,495 | B1 | 7/2004 | Dunning et al. |
| 6,879,910 | B2 | 4/2005 | Shike et al. |
| 6,898,585 | B2 | 5/2005 | Benson et al. |
| 6,963,795 | B2 | 11/2005 | Hassig et al. |
| 6,975,246 | B1 | 12/2005 | Trudeau |
| 7,286,825 | B2 | 10/2007 | Shishido et al. |
| 7,460,951 | B2 | 12/2008 | Altan et al. |
| 7,554,435 | B2 | 6/2009 | Tengler et al. |
| 7,593,811 | B2 | 9/2009 | Schmidt et al. |
| 7,729,823 | B2 | 6/2010 | Ruoppolo |
| 7,782,227 | B2 | 8/2010 | Boss et al. |
| 7,831,345 | B2 | 11/2010 | Vauramo |
| 7,894,982 | B2 | 2/2011 | Reeser et al. |
| 8,026,833 | B2 | 9/2011 | Scacchi |
| 8,073,574 | B2 | 12/2011 | Yamamoto et al. |
| 8,116,921 | B2 | 2/2012 | Ferrin |
| 8,139,109 | B2 | 3/2012 | Schmiedel et al. |
| 8,224,551 | B2 | 7/2012 | Grolle et al. |
| 8,275,491 | B2 | 9/2012 | Ferrin et al. |
| 8,326,473 | B2 | 12/2012 | Simpson et al. |
| 8,352,111 | B2 | 1/2013 | Mudalige |
| 8,352,112 | B2 | 1/2013 | Mudalige |
| 8,354,955 | B2 | 1/2013 | Miyake |
| 8,442,735 | B2 | 5/2013 | Hrovat et al. |
| 8,510,029 | B2 | 8/2013 | Curtis et al. |
| 8,538,656 | B2 | 9/2013 | Yamashiro |
| 8,554,468 | B1 | 10/2013 | Bullock |
| 8,618,922 | B2 | 12/2013 | Debouk et al. |
| 8,620,517 | B2 | 12/2013 | Caveney et al. |
| 8,649,962 | B2 | 2/2014 | Davis et al. |
| 8,660,779 | B2 | 2/2014 | Shida |
| 8,666,587 | B2 | 3/2014 | Anderson |
| 8,676,466 | B2 | 3/2014 | Mudalige |
| 8,682,511 | B2 | 3/2014 | Andreasson |
| 8,688,349 | B2 | 4/2014 | Grolle et al. |
| 8,738,238 | B2 | 5/2014 | Rekow |
| 8,744,666 | B2 | 6/2014 | Switkes et al. |
| 8,775,060 | B2 | 7/2014 | Solyom et al. |
| 8,798,907 | B2 | 8/2014 | Shida |
| 8,922,391 | B2 | 12/2014 | Rubin et al. |
| 8,947,531 | B2 | 2/2015 | Fischer et al. |
| 8,948,995 | B2 | 2/2015 | Pandita et al. |
| 8,954,272 | B2 | 2/2015 | Adam et al. |
| 8,970,401 | B2 | 3/2015 | Molander et al. |
| 8,992,391 | B2 | 3/2015 | Seastrom et al. |
| 9,037,389 | B2 | 5/2015 | You |
| 9,079,587 | B1 | 7/2015 | Rupp et al. |
| 9,141,112 | B1 | 9/2015 | Loo et al. |
| 9,145,137 | B2 | 9/2015 | Doi et al. |
| 9,174,672 | B2 | 11/2015 | Zeng et al. |
| 9,182,764 | B1 | 11/2015 | Kolhouse et al. |
| 9,221,396 | B1 | 12/2015 | Zhu et al. |
| 9,224,300 | B2 | 12/2015 | Lee et al. |
| 9,355,423 | B1 | 5/2016 | Slusar |
| 9,367,065 | B2 | 6/2016 | Dolgov et al. |
| 9,373,149 | B2 | 6/2016 | Abhyanker |
| 9,396,661 | B2 | 7/2016 | Okamoto |
| 9,412,271 | B2 | 8/2016 | Sharma |
| 9,423,794 | B2 | 8/2016 | Lind et al. |
| 9,449,258 | B1 | 9/2016 | Palacio et al. |
| 9,460,622 | B1 | 10/2016 | Franklin et al. |
| 9,494,944 | B2 | 11/2016 | Alam et al. |
| 9,511,764 | B2 | 12/2016 | Pilutti et al. |
| 9,582,006 | B2 | 2/2017 | Switkes et al. |
| 9,598,078 | B2 | 3/2017 | Moran et al. |
| 9,613,466 | B1 | 4/2017 | Bullock |
| 9,616,743 | B1 | 4/2017 | Mays et al. |
| 9,632,507 | B1 | 4/2017 | Korn |
| 9,645,579 | B2 | 5/2017 | Switkes et al. |
| 9,665,102 | B2 | 5/2017 | Switkes et al. |
| 9,721,474 | B2 | 8/2017 | Eskilson |
| 9,725,083 | B2 * | 8/2017 | Dextreit .............. B60W 50/082 |
| 9,771,070 | B2 | 9/2017 | Zagorski et al. |
| 9,799,224 | B2 | 10/2017 | Okamoto |
| 9,823,166 | B2 | 11/2017 | Dudar et al. |
| 9,852,475 | B1 | 12/2017 | Konrardy et al. |
| 9,878,657 | B2 | 1/2018 | Wunsche et al. |
| 9,884,631 | B2 | 2/2018 | James et al. |
| 9,927,816 | B2 | 3/2018 | Karoui et al. |
| 9,928,746 | B1 | 3/2018 | MacNeille et al. |
| 9,940,840 | B1 | 4/2018 | Schubert et al. |
| 9,956,964 | B2 | 5/2018 | Desnoyer et al. |

(56) References Cited

U.S. PATENT DOCUMENTS

| | | | |
|---|---|---|---|
| 9,964,948 B2 | 5/2018 | Ullrich et al. |
| 10,013,877 B2 | 7/2018 | Lu et al. |
| 10,017,039 B1 | 7/2018 | Colavincenzo |
| 10,017,179 B2 | 7/2018 | Alden et al. |
| 10,027,024 B2 | 7/2018 | Powell |
| 10,031,522 B2 | 7/2018 | Moran et al. |
| 10,042,365 B2 | 8/2018 | Switkes et al. |
| 10,074,894 B1 | 9/2018 | Birnbaum et al. |
| 10,078,338 B2 | 9/2018 | Smartt et al. |
| 10,152,064 B2 | 12/2018 | Switkes et al. |
| 10,162,366 B2 | 12/2018 | Switkes et al. |
| 2001/0001138 A1 | 5/2001 | Zhu et al. |
| 2002/0077748 A1 | 6/2002 | Nakano |
| 2002/0133285 A1* | 9/2002 | Hirasago | B60K 31/0008 701/96 |
| 2002/0135507 A1 | 9/2002 | Winner et al. |
| 2002/0152015 A1 | 10/2002 | Seto |
| 2002/0198632 A1 | 12/2002 | Breed et al. |
| 2003/0094858 A1 | 5/2003 | Shiue et al. |
| 2003/0225517 A1 | 12/2003 | Schiffmann |
| 2004/0046448 A1 | 3/2004 | Brown |
| 2004/0078133 A1 | 4/2004 | Miller et al. |
| 2004/0140143 A1 | 7/2004 | Saeki et al. |
| 2004/0245853 A1 | 12/2004 | Odagawa et al. |
| 2004/0252863 A1 | 12/2004 | Chang et al. |
| 2006/0074557 A1 | 4/2006 | Mulligan et al. |
| 2006/0089771 A1 | 4/2006 | Messih et al. |
| 2006/0095195 A1 | 5/2006 | Nishimura et al. |
| 2006/0106534 A1 | 5/2006 | Kawamata et al. |
| 2006/0161341 A1 | 7/2006 | Haegebarth et al. |
| 2006/0195250 A1 | 8/2006 | Kawaguchi |
| 2006/0229804 A1 | 10/2006 | Schmidt et al. |
| 2007/0005609 A1 | 1/2007 | Breed |
| 2007/0021915 A1 | 1/2007 | Breed et al. |
| 2007/0027614 A1 | 2/2007 | Reeser et al. |
| 2007/0030212 A1* | 2/2007 | Shibata | G06T 5/50 345/9 |
| 2007/0032245 A1 | 2/2007 | Alapuranen |
| 2007/0043502 A1 | 2/2007 | Mudalige et al. |
| 2007/0060045 A1 | 3/2007 | Prautzsch |
| 2007/0083318 A1 | 4/2007 | Parikh |
| 2007/0115138 A1* | 5/2007 | Arakawa | B60R 1/00 340/901 |
| 2007/0210953 A1 | 9/2007 | Abraham et al. |
| 2007/0213915 A1 | 9/2007 | Tenge et al. |
| 2007/0233337 A1 | 10/2007 | Plishner |
| 2007/0244641 A1 | 10/2007 | Altan et al. |
| 2007/0256481 A1 | 11/2007 | Nishiyama et al. |
| 2007/0276597 A1 | 11/2007 | Kato et al. |
| 2008/0009985 A1 | 1/2008 | Plishner |
| 2008/0033649 A1 | 2/2008 | Hasegawa et al. |
| 2008/0040023 A1 | 2/2008 | Breed et al. |
| 2008/0059007 A1 | 3/2008 | Whittaker et al. |
| 2008/0119965 A1 | 5/2008 | McCrary |
| 2008/0122652 A1 | 5/2008 | Tengler et al. |
| 2008/0147253 A1 | 6/2008 | Breed |
| 2008/0154629 A1 | 6/2008 | Breed et al. |
| 2008/0249667 A1 | 10/2008 | Horvitz et al. |
| 2008/0255722 A1 | 10/2008 | McClellan et al. |
| 2008/0258890 A1 | 10/2008 | Follmer et al. |
| 2009/0012666 A1 | 1/2009 | Simpson et al. |
| 2009/0051510 A1 | 2/2009 | Follmer et al. |
| 2009/0062974 A1 | 3/2009 | Tamamoto et al. |
| 2009/0079839 A1* | 3/2009 | Fischer | G01S 7/003 348/218.1 |
| 2009/0118889 A1 | 5/2009 | Helno et al. |
| 2009/0157461 A1 | 6/2009 | Wright et al. |
| 2009/0164082 A1 | 6/2009 | Kobayashi et al. |
| 2009/0198427 A1 | 8/2009 | Jackson et al. |
| 2009/0219161 A1 | 9/2009 | Kocher |
| 2009/0222186 A1 | 9/2009 | Jensen |
| 2009/0259354 A1 | 10/2009 | Krupadanam et al. |
| 2009/0271083 A1 | 10/2009 | Kumar |
| 2009/0286648 A1 | 11/2009 | Vesenjak |
| 2009/0287412 A1 | 11/2009 | Menzel et al. |
| 2009/0326799 A1 | 12/2009 | Crook |
| 2010/0044998 A1 | 2/2010 | Franchineau |
| 2010/0045507 A1 | 2/2010 | Yamano et al. |
| 2010/0049374 A1 | 2/2010 | Ferrin et al. |
| 2010/0094509 A1 | 4/2010 | Luke et al. |
| 2010/0106356 A1 | 4/2010 | Trepagnier et al. |
| 2010/0191449 A1 | 7/2010 | Iawamoto |
| 2010/0194638 A1 | 8/2010 | Rivard |
| 2010/0250088 A1 | 9/2010 | Grolle et al. |
| 2010/0256835 A1 | 10/2010 | Mudalige |
| 2010/0256836 A1 | 10/2010 | Mudalige |
| 2010/0256852 A1 | 10/2010 | Mudalige |
| 2010/0332101 A1 | 12/2010 | Braunberger et al. |
| 2011/0010022 A1 | 1/2011 | Beavin |
| 2011/0083011 A1 | 4/2011 | Dicrescenzo |
| 2011/0093177 A1 | 4/2011 | Horn |
| 2011/0112730 A1 | 5/2011 | Rekow |
| 2011/0118967 A1 | 5/2011 | Tsuda |
| 2011/0184596 A1 | 7/2011 | Andreasson |
| 2011/0184605 A1 | 7/2011 | Neff |
| 2011/0210872 A1 | 9/2011 | Molander |
| 2011/0222730 A1 | 9/2011 | Steinberg et al. |
| 2011/0270514 A1 | 11/2011 | Shida |
| 2011/0270520 A1 | 11/2011 | Kronenberg |
| 2011/0274523 A1 | 11/2011 | Petalas |
| 2011/0301779 A1 | 12/2011 | Shida |
| 2012/0061154 A1 | 3/2012 | Pfister |
| 2012/0086582 A1 | 4/2012 | Durekovic et al. |
| 2012/0089294 A1 | 4/2012 | Fehse et al. |
| 2012/0105270 A1 | 5/2012 | Miyake et al. |
| 2012/0109421 A1 | 5/2012 | Scarola |
| 2012/0109610 A1 | 5/2012 | Anderson et al. |
| 2012/0123660 A1 | 5/2012 | Kagawa et al. |
| 2012/0139549 A1 | 6/2012 | Sufrin-Disler et al. |
| 2012/0166057 A1 | 6/2012 | Amato et al. |
| 2012/0206282 A1 | 8/2012 | Gorbold |
| 2012/0221235 A1 | 8/2012 | Prudhomme-Lacroix et al. |
| 2012/0226965 A1 | 9/2012 | Hammererschmidt et al. |
| 2012/0239268 A1 | 9/2012 | Chen et al. |
| 2012/0252415 A1 | 10/2012 | Menzel et al. |
| 2012/0259516 A1 | 10/2012 | Grolie et al. |
| 2012/0259538 A1 | 10/2012 | Oexmann |
| 2012/0323474 A1 | 12/2012 | Breed et al. |
| 2013/0015984 A1 | 1/2013 | Yamashiro |
| 2013/0018766 A1 | 1/2013 | Christman |
| 2013/0024084 A1 | 1/2013 | Yamashiro |
| 2013/0030606 A1 | 1/2013 | Mudalige et al. |
| 2013/0030657 A1 | 1/2013 | Chatterjee et al. |
| 2013/0041567 A1 | 2/2013 | Yamashiro |
| 2013/0041576 A1 | 2/2013 | Switkes et al. |
| 2013/0066511 A1 | 3/2013 | Switkes et al. |
| 2013/0079953 A1 | 3/2013 | Kumabe |
| 2013/0080040 A1 | 3/2013 | Kumabe |
| 2013/0080041 A1 | 3/2013 | Kumabe |
| 2013/0090803 A1 | 4/2013 | Stahlin et al. |
| 2013/0116861 A1 | 5/2013 | Nemoto |
| 2013/0124064 A1 | 5/2013 | Nemoto |
| 2013/0144465 A1 | 6/2013 | Shida |
| 2013/0144502 A1 | 6/2013 | Shida |
| 2013/0151058 A1 | 6/2013 | Zagorski et al. |
| 2013/0158852 A1 | 6/2013 | Stahlin et al. |
| 2013/0165146 A1 | 6/2013 | Stahlin et al. |
| 2013/0173114 A1 | 7/2013 | Pillai |
| 2013/0211624 A1 | 8/2013 | Lind et al. |
| 2013/0218365 A1 | 8/2013 | Caveney et al. |
| 2013/0231820 A1 | 9/2013 | Solyom et al. |
| 2013/0235169 A1* | 9/2013 | Kato | G02B 27/01 348/53 |
| 2013/0317676 A1 | 11/2013 | Cooper et al. |
| 2013/0325306 A1 | 12/2013 | Caveney et al. |
| 2014/0005875 A1 | 1/2014 | Hartmann et al. |
| 2014/0005906 A1 | 1/2014 | Pandita et al. |
| 2014/0005941 A1 | 1/2014 | Paek et al. |
| 2014/0019031 A1 | 1/2014 | Solyom et al. |
| 2014/0067220 A1 | 3/2014 | Seiler |
| 2014/0100734 A1 | 4/2014 | Yamashiro |
| 2014/0107867 A1 | 4/2014 | Yamashiro |
| 2014/0129075 A1 | 5/2014 | Carleton |
| 2014/0136044 A1 | 5/2014 | Conrad |

(56) References Cited

U.S. PATENT DOCUMENTS

| | | |
|---|---|---|
| 2014/0142799 A1 | 5/2014 | Ferguson et al. |
| 2014/0142801 A1 | 5/2014 | Shah |
| 2014/0145838 A1 | 5/2014 | Tuukkanen |
| 2014/0148994 A1 | 5/2014 | Ando |
| 2014/0156118 A1 | 6/2014 | Wiemeyer et al. |
| 2014/0172265 A1 | 6/2014 | Funabashi |
| 2014/0197967 A1 | 7/2014 | Modica et al. |
| 2014/0210645 A1 | 7/2014 | Sharma |
| 2014/0214255 A1 | 7/2014 | Dolgov et al. |
| 2014/0222278 A1 | 8/2014 | Fujita |
| 2014/0236414 A1* | 8/2014 | Droz .............. G08G 1/161 701/28 |
| 2014/0236449 A1 | 8/2014 | Horn |
| 2014/0244144 A1 | 8/2014 | You |
| 2014/0249693 A1 | 9/2014 | Stark et al. |
| 2014/0277608 A1 | 9/2014 | Debouk et al. |
| 2014/0297063 A1 | 10/2014 | Shida |
| 2014/0303870 A1 | 10/2014 | Switkes et al. |
| 2014/0306799 A1 | 10/2014 | Ricci |
| 2014/0306826 A1 | 10/2014 | Ricci |
| 2014/0309836 A1 | 10/2014 | Ollis |
| 2014/0316671 A1 | 10/2014 | Okamoto |
| 2014/0316865 A1 | 10/2014 | Okamoto |
| 2014/0324339 A1 | 10/2014 | Adam et al. |
| 2014/0350756 A1 | 11/2014 | Schoonmaker et al. |
| 2014/0350793 A1 | 11/2014 | Schrabler et al. |
| 2014/0350835 A1 | 11/2014 | Martin |
| 2015/0012157 A1 | 1/2015 | Nemeth et al. |
| 2015/0012204 A1 | 1/2015 | Breuer et al. |
| 2015/0015267 A1 | 1/2015 | Mueller et al. |
| 2015/0025731 A1 | 1/2015 | Uehara |
| 2015/0045993 A1 | 2/2015 | Cooper et al. |
| 2015/0061492 A1 | 3/2015 | Braunberger |
| 2015/0100192 A1 | 4/2015 | Lee et al. |
| 2015/0120137 A1 | 4/2015 | Zeng et al. |
| 2015/0151737 A1 | 6/2015 | Birch et al. |
| 2015/0153733 A1 | 6/2015 | Ohmura et al. |
| 2015/0153738 A1 | 6/2015 | Al-Buraiki et al. |
| 2015/0154871 A1 | 6/2015 | Rothoff et al. |
| 2015/0161894 A1 | 6/2015 | Duncan et al. |
| 2015/0178998 A1 | 6/2015 | Attard et al. |
| 2015/0251676 A1 | 9/2015 | Golden et al. |
| 2015/0262481 A1 | 9/2015 | Selin |
| 2015/0274161 A1 | 10/2015 | Stierlin |
| 2015/0279122 A1 | 10/2015 | Lorenzen |
| 2015/0291160 A1* | 10/2015 | Kim .............. B60W 30/16 345/633 |
| 2015/0296019 A1 | 10/2015 | Onishi et al. |
| 2015/0314790 A1 | 11/2015 | Deragarden et al. |
| 2015/0334371 A1 | 11/2015 | Galera et al. |
| 2015/0356635 A1 | 12/2015 | Thurston |
| 2015/0378722 A1 | 12/2015 | Zuniga-Hernandez |
| 2016/0009284 A1 | 1/2016 | Tokimasa et al. |
| 2016/0009288 A1 | 1/2016 | Yu |
| 2016/0019782 A1 | 1/2016 | Alam et al. |
| 2016/0026187 A1 | 1/2016 | Alam et al. |
| 2016/0039412 A1 | 2/2016 | Stahlin |
| 2016/0054735 A1 | 2/2016 | Switkes et al. |
| 2016/0102981 A1 | 4/2016 | Hubbard et al. |
| 2016/0170021 A1 | 6/2016 | Rashid et al. |
| 2016/0170487 A1* | 6/2016 | Saisho ............ G01C 21/3635 345/156 |
| 2016/0187141 A1 | 6/2016 | Kulkarni et al. |
| 2016/0194014 A1 | 7/2016 | Rajendran |
| 2016/0198303 A1 | 7/2016 | Grotendorst et al. |
| 2016/0240085 A1* | 8/2016 | Otsuka ............ G06K 9/00805 |
| 2016/0267796 A1 | 9/2016 | Hiroma et al. |
| 2016/0272207 A1 | 9/2016 | Dolgov et al. |
| 2016/0273930 A1 | 9/2016 | Wada et al. |
| 2016/0297447 A1 | 10/2016 | Suzuki |
| 2016/0300186 A1 | 10/2016 | Scharaswak et al. |
| 2016/0359741 A1 | 12/2016 | Cooper et al. |
| 2016/0362048 A1 | 12/2016 | Matthews et al. |
| 2016/0373261 A1 | 12/2016 | Tschache et al. |
| 2016/0375732 A1 | 12/2016 | Lazar et al. |
| 2017/0011633 A1 | 1/2017 | Boegel |
| 2017/0036601 A1* | 2/2017 | Kimura .............. B60R 1/00 |
| 2017/0058477 A1 | 3/2017 | Niroumand |
| 2017/0069203 A1 | 3/2017 | Sharma |
| 2017/0083844 A1 | 3/2017 | Baker et al. |
| 2017/0115666 A1 | 4/2017 | Kolhouse et al. |
| 2017/0122841 A1 | 5/2017 | Dudar et al. |
| 2017/0132299 A1 | 5/2017 | Fox et al. |
| 2017/0146801 A1 | 5/2017 | Stempora |
| 2017/0168503 A1 | 6/2017 | Amla et al. |
| 2017/0174223 A1 | 6/2017 | Munasinghe et al. |
| 2017/0178536 A1 | 6/2017 | Manci et al. |
| 2017/0186327 A1 | 6/2017 | Uysal et al. |
| 2017/0197544 A1 | 7/2017 | Wang et al. |
| 2017/0197615 A1 | 7/2017 | Elie et al. |
| 2017/0212511 A1 | 7/2017 | Paiva Ferreira et al. |
| 2017/0227972 A1 | 8/2017 | Sabau |
| 2017/0235316 A1 | 8/2017 | Shattil |
| 2017/0238321 A1 | 8/2017 | Sartori |
| 2017/0242095 A1 | 8/2017 | Schuh et al. |
| 2017/0242443 A1 | 8/2017 | Schuh et al. |
| 2017/0261997 A1 | 9/2017 | Switkes et al. |
| 2017/0287233 A1 | 10/2017 | Nix |
| 2017/0289864 A1 | 10/2017 | Narasimha et al. |
| 2017/0293296 A1 | 10/2017 | Stenneth et al. |
| 2017/0305365 A1* | 10/2017 | Matsumoto ............ B60R 16/02 |
| 2017/0308097 A1 | 10/2017 | Switkes et al. |
| 2017/0309187 A1 | 10/2017 | Lin |
| 2017/0323244 A1 | 11/2017 | Rani et al. |
| 2017/0329348 A1 | 11/2017 | Li et al. |
| 2017/0344023 A1 | 11/2017 | Laubinger et al. |
| 2017/0349058 A1 | 12/2017 | Bernier et al. |
| 2017/0349176 A1 | 12/2017 | Alden et al. |
| 2017/0361762 A1 | 12/2017 | Wunsche et al. |
| 2017/0363430 A1 | 12/2017 | Al-Dahle et al. |
| 2018/0006365 A1 | 1/2018 | Powell |
| 2018/0018605 A1 | 1/2018 | Light-Holets et al. |
| 2018/0032072 A1 | 2/2018 | Hoye |
| 2018/0047293 A1 | 2/2018 | Dudar |
| 2018/0050697 A1 | 2/2018 | Kuszmaul et al. |
| 2018/0074514 A1 | 3/2018 | Switkes et al. |
| 2018/0082590 A1 | 3/2018 | MacNeille et al. |
| 2018/0082591 A1 | 3/2018 | Pandy |
| 2018/0084511 A1 | 3/2018 | Wu et al. |
| 2018/0111611 A1 | 4/2018 | MacNeille et al. |
| 2018/0120861 A1 | 5/2018 | Saxena et al. |
| 2018/0137763 A1 | 5/2018 | Deragarden et al. |
| 2018/0143650 A1 | 5/2018 | Klaus et al. |
| 2018/0143651 A1 | 5/2018 | Klaus et al. |
| 2018/0144640 A1 | 5/2018 | Price et al. |
| 2018/0186381 A1 | 7/2018 | Erlien et al. |
| 2018/0188725 A1 | 7/2018 | Cremona et al. |
| 2018/0188744 A1 | 7/2018 | Switkes et al. |
| 2018/0188745 A1 | 7/2018 | Pilkington |
| 2018/0188746 A1 | 7/2018 | Lesher et al. |
| 2018/0190119 A1 | 7/2018 | Miller et al. |
| 2018/0190128 A1 | 7/2018 | Saigusa |
| 2018/0210457 A1 | 7/2018 | Smartt et al. |
| 2018/0210461 A1 | 7/2018 | Cremona et al. |
| 2018/0210462 A1 | 7/2018 | Switkes et al. |
| 2018/0210463 A1 | 7/2018 | Switkes et al. |
| 2018/0210464 A1 | 7/2018 | Switkes et al. |
| 2018/0211544 A1 | 7/2018 | Smartt et al. |
| 2018/0211545 A1 | 7/2018 | Smartt et al. |
| 2018/0211546 A1 | 7/2018 | Smartt et al. |
| 2018/0217610 A1 | 8/2018 | Schuh et al. |
| 2018/0267559 A1 | 9/2018 | Switkes et al. |
| 2018/0314267 A1 | 11/2018 | Switkes et al. |
| 2018/0337703 A1 | 11/2018 | Price et al. |
| 2019/0035284 A1 | 1/2019 | Tam |
| 2019/0068582 A1 | 2/2019 | Kim et al. |
| 2019/0073908 A1 | 3/2019 | Neubecker et al. |

FOREIGN PATENT DOCUMENTS

| | | |
|---|---|---|
| DE | 102014013672 A1 | 4/2015 |
| EP | 1975901 B1 | 3/2009 |
| EP | 2390744 B1 | 11/2012 |
| EP | 3316064 A1 | 5/2018 |

(56) References Cited

FOREIGN PATENT DOCUMENTS

| | | |
|---|---|---|
| GB | 982173 A | 2/1965 |
| GB | 991046 A | 5/1965 |
| GB | 2540039 A | 1/2017 |
| GB | 2551248 A | 12/2017 |
| GB | 2557001 A | 6/2018 |
| GB | 2557434 A | 6/2018 |
| GB | 2558051 A | 7/2018 |
| JP | H05170008 A | 7/1993 |
| JP | 2995970 B2 | 12/1999 |
| JP | 2010030525 A | 2/2010 |
| JP | 5141849 B2 | 2/2013 |
| JP | 5170008 B2 | 3/2013 |
| JP | 2014056483 A | 3/2014 |
| JP | 2017215681 A | 12/2017 |
| WO | 2004077378 A1 | 9/2004 |
| WO | 2009024563 A1 | 2/2009 |
| WO | 2009043643 A1 | 4/2009 |
| WO | 2009071345 A1 | 6/2009 |
| WO | 2010098554 A2 | 9/2010 |
| WO | 2011125193 A1 | 10/2011 |
| WO | 2011151274 A1 | 12/2011 |
| WO | 2013006826 A2 | 1/2013 |
| WO | 2013147682 A1 | 10/2013 |
| WO | 2013165297 A1 | 11/2013 |
| WO | 2013187835 A1 | 12/2013 |
| WO | 2014062118 A1 | 4/2014 |
| WO | 2014092628 A1 | 6/2014 |
| WO | 2014133425 A1 | 9/2014 |
| WO | 2014137270 A1 | 9/2014 |
| WO | 2014137271 A1 | 9/2014 |
| WO | 2014145918 A1 | 9/2014 |
| WO | 2015047174 A1 | 4/2015 |
| WO | 2015047175 A1 | 4/2015 |
| WO | 2015047176 A1 | 4/2015 |
| WO | 2015047177 A1 | 4/2015 |
| WO | 2015047178 A1 | 4/2015 |
| WO | 2015047179 A1 | 4/2015 |
| WO | 2015047181 A1 | 4/2015 |
| WO | 2015047182 A1 | 4/2015 |
| WO | 2015156731 A1 | 10/2015 |
| WO | 2016065055 A1 | 4/2016 |
| WO | 2016087555 A1 | 6/2016 |
| WO | 2016087901 A1 | 6/2016 |
| WO | 2016134610 A1 | 9/2016 |
| WO | 2016134770 A1 | 9/2016 |
| WO | 2016135207 A1 | 9/2016 |
| WO | 2016182489 A1 | 11/2016 |
| WO | 2016201435 A1 | 12/2016 |
| WO | 2017035516 A1 | 3/2017 |
| WO | 2017048165 A1 | 3/2017 |
| WO | 2017164792 A1 | 3/2017 |
| WO | 2017070714 A1 | 4/2017 |
| WO | 2018217219 A1 | 7/2017 |
| WO | 2017148113 A1 | 9/2017 |
| WO | 2017179793 A1 | 10/2017 |
| WO | 2017184062 A1 | 10/2017 |
| WO | 2017184063 A1 | 10/2017 |
| WO | 2017196165 A1 | 11/2017 |
| WO | 2017200433 A1 | 11/2017 |
| WO | 2017204712 A1 | 11/2017 |
| WO | 2017209124 A1 | 12/2017 |
| WO | 2017209666 A1 | 12/2017 |
| WO | 2017210200 A1 | 12/2017 |
| WO | 2018000386 A1 | 1/2018 |
| WO | 2018035145 A1 | 2/2018 |
| WO | 2018038964 A1 | 3/2018 |
| WO | 2018039114 A1 | 3/2018 |
| WO | 2018039134 A1 | 3/2018 |
| WO | 2018043519 A1 | 3/2018 |
| WO | 2018043520 A1 | 3/2018 |
| WO | 2018043753 A1 | 3/2018 |
| WO | 2018054520 A1 | 3/2018 |
| WO | 2018085107 A1 | 5/2018 |
| WO | 2018106774 A1 | 6/2018 |
| WO | 2018111177 A1 | 6/2018 |
| WO | 2018135630 A1 | 7/2018 |
| WO | 2018137754 A1 | 8/2018 |
| WO | 2019014372 A1 | 1/2019 |
| WO | 2018208372 A1 | 2/2019 |

OTHER PUBLICATIONS

Al Alam, Assad et al. "Establishing Safety for Heavy Duty Vehicle Platooning: A Game Theoretical Approach", Proceedings of the 18th World Congress, The International Federation of Automatic Control (IFAC'11) Milano, Italy, Sep. 2011, pp. 3818-3823.

Alvarez, Luis & Horowitz, Roberto, "Safe Platooning in Automated Highway Systems Part I: Safety Regions Design", Vehicle System Dynamics, vol. 32, Jul. 1999, pp. 23-55.

Alvarez, Luis & Horowitz, Roberto, "Safe Platooning in Automated Highway Systems Part II: Velocity Tracking Controller", Vehicle System Dynamics, vol. 32, Jul. 1999, pp. 57-84.

Aoki, Keiji, "Research and development of fully automated vehicles", International Conference "Global/Local nnovations for Next Generation Automobiles" Part 1, paper OS5-1, Nov. 2013, 3 pages.

Automated Highway System: Milestone 2 Report, Task C2: Downselect System Configurations and Workshop #3 (National Automated Highway System Consortium, Troy, MI, Jun. 1997), 604 pages.

Bae, Hong S. et al., "Road Grade and Vehicle Parameter Estimation for Longitudinal Control Using GPS", J001 IEEE Intelligent Transportation Systems Conference Proceedings, Oakland, CA, Aug. 25-29, 2001, pp. 166-171.

Bergenheim, Carl et al., "Vehicle-lo-Vehicle Communication for a Platooning System", Procedia—Social and Behavioral Sciences, vol. 48, Jun. 2012, pp. 1222-1233.

Bergenheim, Carl et al., "Overview of Platooning Systems", 19th ITS World Congress, Vienna, Austria, Oct. 22-26, 2012, 7 pages.

Bevly, David et al. "Heavy Truck Cooperative Adaptive Cruise Control: Evaluation, Testing, and Stakeholder Engagement for Near Term Deployment: Phase One Final Report", Report to Federal Highway Administration (Auburn University, Auburn, AL, Apr. 2015), 135 pages;Relrieved Aug. 23, 2018 at http://alri—Online.org/wp-conlenl/ uploads/2015/05/DA TPPhase 1 FinalReport.pdf.

Bishop, Richard et al., "While Paper: Automated Driving and Platooning Issues and Opportunities", ATA Technology and Maintenance Council Future Truck Program, Automated Driving and Platooning Task Force Report Auburn Univ., Auburn, AL, Sep. 2015), 48 pages;Relrieved Nov. 17, 2017 from http://eng.auburn.edu/-dmbevly/-HWA_AU _ TRUCK_EAR/FHWA_AuburnDATP _Phase1 Final Report.

Brizzolara, Davide & Toth, Andrea, "The Emergence of Truck Platooning", Baltic Transport Journal, Mar. 2016, pp. 58-59.

Browand, Fred et al,, "Fuel Saving Achieved in the Field Test of Two Tandem Truck," California PATH Research Report UCB-ITS-PRR-2004-20, Jun. 2004, 29 pages.

Desjardins, Charles, et al., "Cooperative Adaptive Cruise Control: A Reinforcement Learning Approach," IEEE Transactions on Intelligent Transportation Systems, vol. 12, No. 4, pp. 1248-1260, Dec. 2011.

Erlien, "Shared Vehicle Control Using Safe Driving Envelopes for Obstacle Avoidance and Stability", A Dissertation submitted to the Department of Mechanical Engineering and the Committee on Graduate Studies of Stanford University, Mar. 2015.

Holm, "Vehicle Mass and Road Grade Estimation Using Kalman Filter", MSc Thesis, Department of Electrical Engineering, Sweden, Aug. 2011.

Jacobson, Jan et al. "Functional Safety in Systems of Road Vehicles", SP Report 2010:07 (SP Technical Research nstitute of Sweden, Boras, Sweden, Jul. 2010), 50 pages.

Kidambi et al., "Methods in Vehicle Mass and Road Grade Estimation", SAE International, University of Michigan, Apr. 1, 2014.

Klaus et al., U.S. Appl. No. 15/860,024, filed Jan. 3, 2018.

Korean Intellectual Property Office, ISA, "International Search Report and Written Opinion" in PCT Application No. PCT/US2012/045830, dated Jan. 7, 2013, 10 pages.

(56) References Cited

OTHER PUBLICATIONS

Kozan, Recep et al., "An Experimental Approach for Engine Mapping," Modem Applied Science, vol. 3, No. 3, March J009, pp. 3-9.

Kunze, Ralph et al., "Organization and Operation of Electronically Coupled Truck Platoons on German Motorways", International Conference on Intelligent Robotics and Applications, Conference Proceedings ICIRA 2009, Singapore, Dec. 2009, pp. 135-146.

Kunze, Ralph et al. "Efficient Organization of Truck Platoons by Means of Data Mining", ICINCO 2010, Proceedings of the 7th International Conference on Informatics in Control, Automation and Robotics, vol. 1, Funchal, Madeira, Portugal, Jan. 2010, pp. 104-113.

Kuszmaul et al., U.S. Appl. No. 15/605,456, filed May 25, 2017.

Jacobson et al., "Functional Safety in Systems of Road Vehicles", SP Technical Research Institute of Sweden, Jul. 2010.

Larson, Jeffrey et al., "Coordinated Route Optimization for Heavy-duty Vehicle Platoons", Proceedings of the 16th International IEEE Annual Conference on Intelligent Transportation Systems (ITSC 2013), The Hague, The Netherlands, Oct. 2013, pp. 1196-1202.

Li, Shengbo Eben et al., "Strategies to Minimize Fuel Consumption of Passenger Cars during Car-Following Scenario," J011 American Control Conference, San Francisco, CA, USA, Jun. 29-Jul. 1, 2011, pp. 2107-2112.

Lu, Xiao-Yun & Shladover, Steven E., "Automated Truck Platoon Control and Field Test", in Road Vehicle Automation, Lecture Notes in Mobility, G. Meyer & S. Beiker (eds) (Springer Intl. Publishing, Switzerland, Jul. 2014), pp. 247-261.

Meisen, Philipp et al. "A Data-Mining Technique for the Planning and Organization of Truck Platoons", International Conference on Heavy Vehicles, Paris, France, vol. 10, May 2008, pp. 270-279.

Michaelian, Mark, et al., "Field Experiments Demonstrate Fuel Savings for Close-Following," California PATH Research Report UCB-ITS-PRR-2000-14, 28 pages, Sep. 2000.

Micheau, Philippe, et al., "Revolution Speed Limiter for Engine Subjected to Large Load Variation," IFAC Advances in Automotive Control, Salerno, Italy, 2004, pp. 221-226.

Nowakowski, Christopher, et al., "Cooperative Adaptive Cruise Control: Testing Drivers' Choices of Following Distances," California PATH Research Report UCB-ITS-PRR-2011-01, 171 pages, Jan. 2011.

Nowakowski, Christopher et al., "Cooperative Adaptive Cruise Control (CACC) for Truck Platooning: Operational Concept Alternatives", Research Report under Cooperative Agreement No. DTFH61-13-H-00012 Task 1.2, California PATH Program, (U.C. Berkeley, Berkeley, CA, Mar. 2015), 50 pages; Retrieved Aug. 25, 2017 from http://escholarship.org/uc/item/7jf9n5wm.

Nowakowski, Christopher et al., "Heavy vehicle automation: Human factors lessons learned", Procedia Manufacturing vol. 3, Jul. 2015, pp. 2945-2952.

Packard, Andrew et al., "Section 5, Simple Cruise Control," ME 132, Dynamic Systems and Feedback, Class Notes, Spring 2005, Instructor Prof. A. Packard, Department of Mechanical Engineering, UC Berkeley, pp. 24-52.

Paulsson et al., "Vehicle Mass and Road Grade Estimation Using Recursive Least Squares", MSc Thesis, Lund University, 2016.

Porche, Isaac R., et al., "Real Time Task Manager for Communications and Control in Multicar Platoons," Proceedings of the Intelligent Vehicles '92 Symposium, pp. 409-414, Jun. 29- Jul. 1, 1992.

Ramakers, Richard et al., "Electronically coupled truck platoons on German highways," Proceedings of the 2009 7 EEE International Conference on Systems, Man, and Cybernetics, San Antonio, TX, USA—Oct. 2009, pp. 2409-2414.

Roeth, Michael, "CR England Peloton Technology Platooning Test Nov. 2013", {North American Council on Freight Efficiency {NACFE. org), Fort Wayne, IN, Dec. 2013); Retrieved Aug. 23, 2018 at hllps://nacfe.org/wp-contenl/uploads/2018/02/Peloton-NACFE-Fuel-Test-Report-120213.pdf.

SAE International, Surface Vehicle Recommended Practice, J1939-71, Mar. 2011, Vehicle Application Layer, 1201 pages.

Sheikholeslam, Shahab, et al., "A System Level Study of the Longitudinal Control of a Platoon of Vehicles," Transactions of the ASME, vol. 114, pp. 286-292, Jun. 1992.

Sheikholeslam, Shahab, et al., "Longitudinal Control of a Platoon of Vehicles," Proceedings of the American Control Conference, May 23-25, 1990, pp. 291-296.

"Kozan, Recep et al., ""An Experimental Approach for Engine Mapping,"" Modem Applied Science, vol. 3, No. 3, Mar. J009, pp. 3-9.".

Lu, Xiao-Yun & Shladover, Steven E., "Automated Truck Platoon Control and Field Test", in Road Vehicle Automation, Lecture Notes in Mobility, G. Meyer & S. Beiker (eds) (Springer Intl. Publishing, Switzerland, Jul. 2014), p. 247-261.

Montvey, et al., Priority Document associated with EP Application No. 03 100457.5., Feb. 25, 2003.

Sheikholeslam, Shahab, et al., "Longitudinal Control of a Platoon of Vehicles; III: Nonlinear Model," UCB PATH Report UCB-ITS-PRR-90-1, 25 pages, Apr. 1990.

Shladover, Steven E., "Development and Evaluation of Selected Mobility Applications for VII (a.k.a. IntelliDrive)," California PATH PowerPoint Presentation; available at http://slideplayer.com/slide/6981587/, Jul. 1, 2009; 17 pages.

Shladover, Steven E. et al. "Development and Evaluation of Selected Mobility Applications for VII: Concept of 40 ::lperations", California PATH Research Report UCB-ITS-PRR-2011-09, (U.C. Berkeley, Jun. 2011), 109 pages.

Shladover, Steven E. et al. "Development and Evaluation of Selected Mobility Applications for VII: Concept of 40 ::lperations", California PATH Working Paper UCB-ITS-PWP-2009-3 (U.C. Berkeley, Berkeley, CA, Mar. 2009), 14 pages.

Shladover, Steven E., et al., "Demonstration of Automated Heavy-Duty Vehicles," California PATH Research Report UCB-ITS-PRR-2005-23, Jun. 2005, 459 pages.

Shladover, Steven E. et al., "Cooperative Adaptive Cruise Control: Definitions and Operating Concepts", Transportation Research Record: Journal of the Transportation Research Board, vol. 2489, Nov. 2015, pp. 145-152.

Sugimachi, Toshiyuki et al., "Development of Autonomous Platooning System for Heavy-duty Trucks," Proceedings of the 7th IFAC Symposium on Advances in Automotive Control, The International Federation of Automatic Control, Sep. 4-7, 2013. Tokyo, Japan, IFAC Proceedings Volumes vol. 46, Issue 21, (2013) pp. 52-57.

"Surface Vehicle Recommended Practice, J1939-71, Vehicle Application Layer" (SAE International, Warrendale, PA, Mar. 2011), 1201 pages.

Switkes et al., International Application No. PCT/USI7/47771, filed on Aug. 21, 2017.

Tsao et al., "An Automated Highway System Dedicated to Inter-City Trucking: Design Options, Operating Concepts, and Deployment", 2002, ITS Journal 7:169-196, San Jose State University, San Jose, CA, p. 174-176 (Year: 2002).

Tsugawa, Sadayuki et al., "An Overview on an Automated Truck Platoon within the Energy ITS Project", Proceedings of the 7th IFAC Symposium on Advances in Automotive Control, Tokyo, Japan, IFAC Proceedings vol. 16, Issue 21, Sep. 2013, pp. 41-46.

Tsugawa, Sada Yuki et al., "A Review of Truck Platooning Projects for Energy Savings", IEEE Transactions on Intelligent Vehicles, vol. 1 No. 1, Mar. 2016, pp. 68-77.

Tsugawa, Sadayuki, et al., "An Automated Truck Platoon for Energy Saving," 2011 IEEE/RSJ International Conference on Intelligent Robots and Systems, pp. 4109-4114, Sep. 25-30, 2011.

Wille, Matthias et al., "KONVOI: Electronically coupled truck convoys", in Human Factors for Assistance and Automation, D. de Waard et al. {Eds.) {Shaker Publishing, Maastricht, the Netherlands, Jan. 2008), pp. 243-256.

U.S. Appl. No. 61/167,121, filed Apr. 6, 2009.
U.S. Appl. No. 15/590,803, filed May 9, 2017.
U.S. Appl. No. 15/926,813, filed Mar. 20, 2018.
U.S. Appl. No. 15/926,805, filed Mar. 20, 2018.
U.S. Appl. No. 15/908,677, filed Feb. 28, 2018.

(56) References Cited

OTHER PUBLICATIONS

U.S. Appl. No. 15/908,745, filed Feb. 28, 2018.
U.S. Appl. No. 15/988,905, filed May 24, 2018.
U.S. Office Action dated Jun. 15, 2018 from U.S. Appl. No. 15/590,803.
U.S. Office Action dated May 17, 2019 from U.S. Appl. No. 15/590,803.
U.S. Office Action dated Feb. 4, 2019 from U.S. Appl. No. 15/590,803.
U.S. Office Action dated Mar. 21, 2019 from U.S. Appl. No. 15/926,809.
U.S. Office Action dated Nov. 28, 2018 from U.S. Appl. No. 15/926,809.
U.S. Office Action dated May 13, 2019 from U.S. Appl. No. 15/926,813.
U.S. Final Office Action dated Sep. 5, 2018 from U.S. Appl. No. 15/936,271.
U.S. Office Action dated Jun. 19, 2018 from U.S. Appl. No. 15/936,271.
U.S. Office Action dated Feb. 12, 2019 from U.S. Appl. No. 15/936,271.
U.S. Office Action dated May 9, 2019 from U.S. Appl. No. 15/936,271.
White Paper, "Automated Driving and Platooning Issues and Opportunities", ATA Technology and Maintenance Council Future Truck Program, Sep. 21, 2015.
Zabat, Michael et al., "The Aerodynamic Performance of Platoons: Final Report," California PATH Research Report UCB-ITS-PRR-95-35, 172 pages, Oct. 1995.
Zhao Siyang et al., "Vehicle to Vehicle Communication and Platooning for EV with Wireless Sensor Network", SICE Annual Conference 2015, Hangzhou, China, Jul. 2015, pp. 1435-1440.
"Friedrichs, Andreas et al., ""A Generic Sollware Architecture for a Driver Information System to Organize and Operate Truck Platoons,"" Conference Paper—May 2008, pp. 250-259.".
"Geiger, Andreas et al., ""Team AnnieWAY's Entry to the 2011 Grand Cooperative Driving Challenge""", IEEE Transactions on Intelligent Transportation Systems, vol. 13, No. 3, Sep. 2012, pp. 1008-1017.".
"Gerdes, J. Christian & Hedrick, J. Karl, ""Brake System Requirements for Platooning on an Automated Highway""", Proceedings of the American Control Conference, Seattle, WA, Jun. 1995, pp. 165-169.".
"Gerdes, J.C., et al., Vehicle Speed and Spacing Control Via Coordinated Throttle and Brake Actuation, Control Eng. Practice, vol. 5, No. 11, pp. 1607-1614, Sep. 1997.".
"Halle, Simon, ""Automated Highway Systems: Platoons of Vehicles Viewed as a Multiagent System""", M.Sc. Dissertation, Faculte des Sciences et de Genie (Univ. Laval, Quebec, Canada, Jun. 2005), 194 pages.".
"Hellstrom, Magnus, ""Engine Speed Based Estimation of the Indicated Engine Torque,"" Master's thesis performed at Vehicular Systems, Dept. of Electrical Engineering at Linkopings universitet, Feb. 16, 2005, Reg nr. LiTH-ISYEX-3569-2005, 59 pages.".
"Holm, ""Vehicle Mass and Road Grade Estimation Using Kalman Fitter""", MSc Thesis, Department of Electrical Engineering, Sweden, Aug. 2011.".
International Search Report and Written Opinion in PCT Application No. PCT/US18/023723, dated Dec. 24, 2018, 73 pages.
International Search Report and Written Opinion in PCT Application No. PCT/US16/60167, dated Jan. 19, 2017, 5 pages.
International Search Report and Written Opinion dated Feb. 23, 2018 from International Application No. PCT/US2017/058477.

\* cited by examiner

METHODS AND SYSTEMS FOR SEMI-AUTONOMOUS VEHICULAR CONVOYS

CROSS REFERENCE TO RELATED APPLICATIONS

This application is a continuation of U.S. application Ser. No. 16/028,307, filed Jul. 5, 2018, now U.S. Pat. No. 10,162,366, which is a continuation of U.S. application Ser. No. 15/817,038, filed Nov. 17, 2017, now U.S. Pat. No. 10,042,365, which is a continuation of U.S. application Ser. No. 15/607,316, filed May 26, 2017, which is a continuation of U.S. application Ser. No. 14/292,583, filed May 30, 2014, now U.S. Pat. No. 9,665,102, which is a division of U.S. patent application Ser. No. 13/542,622, filed Jul. 5, 2012, now U.S. Pat. No. 8,744,666, all of which are entitled "Systems and Methods for Semi-Autonomous Vehicular Convoys" and are incorporated by reference herein in their entirety for all purposes. Additionally, U.S. patent application Ser. No. 13/542,622 claims the benefit U.S. Provisional Patent Application No. 61/505,076, filed on Jul. 6, 2011, which is entitled "Systems and Methods for Semi-Autonomous Vehicular Convoying" and is incorporated by reference herein in its entirety for all purposes.

Additionally, U.S. application Ser. No. 14/292,583 is a division U.S. patent application Ser. No. 13/542,627, filed Jul. 5, 2012, now U.S. Pat. No. 9,582,006, entitled "Systems and Methods for Semi-Autonomous Convoying of Vehicles", which is incorporated by reference herein in its entirety for all purposes, and which in turn also claims the benefit of U.S. Provisional Patent Application No. 61/505,076, filed on Jul. 6, 2011.

BACKGROUND

The present invention relates to systems and methods for enabling vehicles to closely follow one another through partial automation. Following closely behind another vehicle has significant fuel savings benefits, but is generally unsafe when done manually by the driver. On the opposite end of the spectrum, fully autonomous solutions require inordinate amounts of technology, and a level of robustness that is currently not cost effective.

Currently the longitudinal motion of vehicles is controlled during normal driving either manually or by convenience systems, and during rare emergencies it may be controlled by active safety systems.

Convenience systems, such as adaptive cruise control, control the speed of the vehicle to make it more pleasurable or relaxing for the driver, by partially automating the driving task. These systems use range sensors and vehicle sensors to then control the speed to maintain a constant headway to the leading vehicle. In general these systems provide zero added safety, and do not have full control authority over the vehicle (in terms of being able to fully brake or accelerate) but they do make the driving task easier, which is welcomed by the driver.

Some safety systems try to actively prevent accidents, by braking the vehicle automatically (without driver input), or assisting the driver in braking the vehicle, to avoid a collision. These systems generally add zero convenience, and are only used in emergency situations, but they are able to fully control the longitudinal motion of the vehicle.

Manual control by a driver is lacking in capability compared to even the current systems, in several ways. First, a manual driver cannot safely maintain a close following distance. In fact, the types of distance to get any measurable gain results in an unsafe condition, risking a costly and destructive accident. Second, the manual driver is not as reliable at maintaining a constant headway as an automated system. Third, a manual driver when trying to maintain a constant headway has rapid and large changes in command (accelerator pedal position for example) that result in a loss of efficiency.

The system described here combines the components to attain the best attributes of the state of the art convenience and safety systems and manual control. By using the components and communication for the very best safety systems, together with an enhanced version of the functionality for convenience systems, together with the features and functionality of a manually controlled vehicle, the current solution provides a safe, efficient convoying solution.

It is therefore apparent that an urgent need exists for reliable and economical Semi-Autonomous Vehicular Convoying. These improved Semi-Autonomous Vehicular Convoying Systems enable vehicles to follow closely together in a safe, efficient, convenient manner.

SUMMARY

To achieve the foregoing and in accordance with the present invention, systems and methods for Semi-Autonomous Vehicular Convoying are provided. In particular the systems and methods for 1) A close following distance to save significant fuel, 2) Safety in the event of emergency maneuvers by the leading vehicle, 3) Safety in the event of component failures in the system, 4) An efficient mechanism for vehicles to find a partner vehicle to follow or be followed by, 5) An intelligent ordering of the vehicles based on several criteria, 6) Other fuel economy optimizations made possible by the close following, 7) Control algorithms to ensure smooth, comfortable, precise maintenance of the following distance, 8) Robust failsafe mechanical hardware, 9) Robust failsafe electronics and communication, 10) Other communication between the vehicles for the benefit of the driver, 11) Prevention of other types of accidents unrelated to the close following mode, 12) A simpler system to enable a vehicle to serve as a leading vehicle without the full system.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to systems and methods for Semi-Autonomous Vehicular Convoying. Such a system enables vehicles to follow closely behind each other, in a convenient, safe manner.

Figure 1:
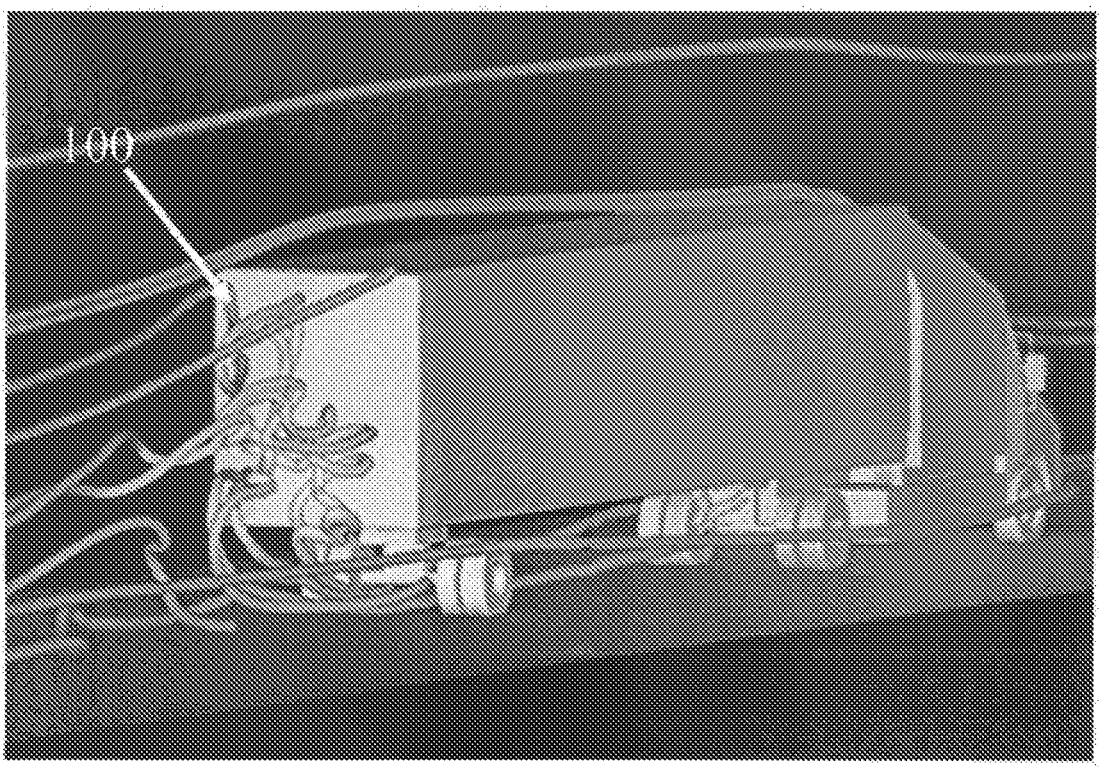
FIG. 1 shows the airflow around a heavy truck.
Figure 2:
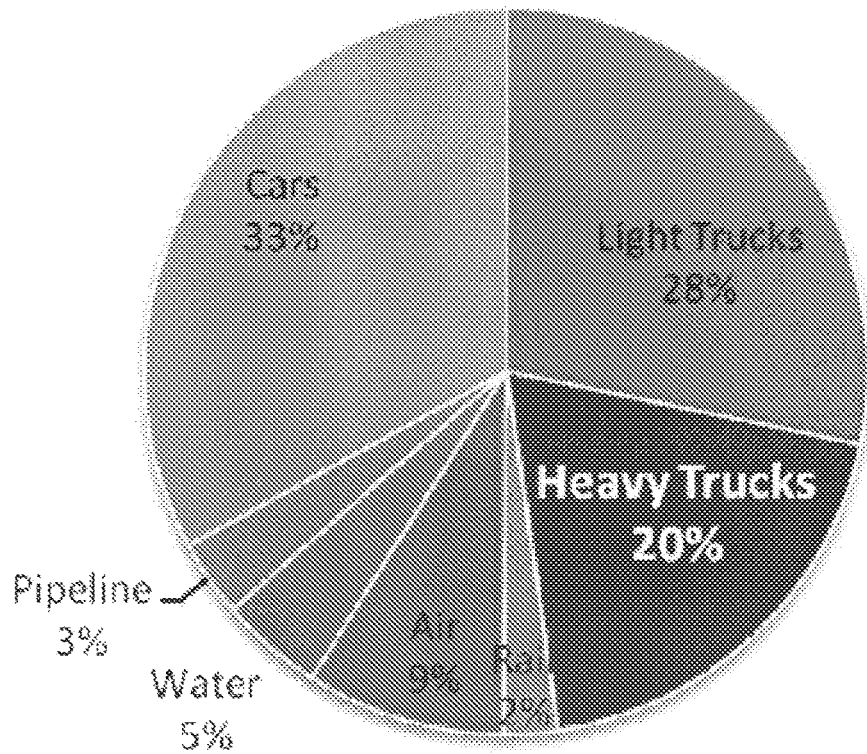
FIG. 2 shows US transportation fuel use.
Figure 3A:
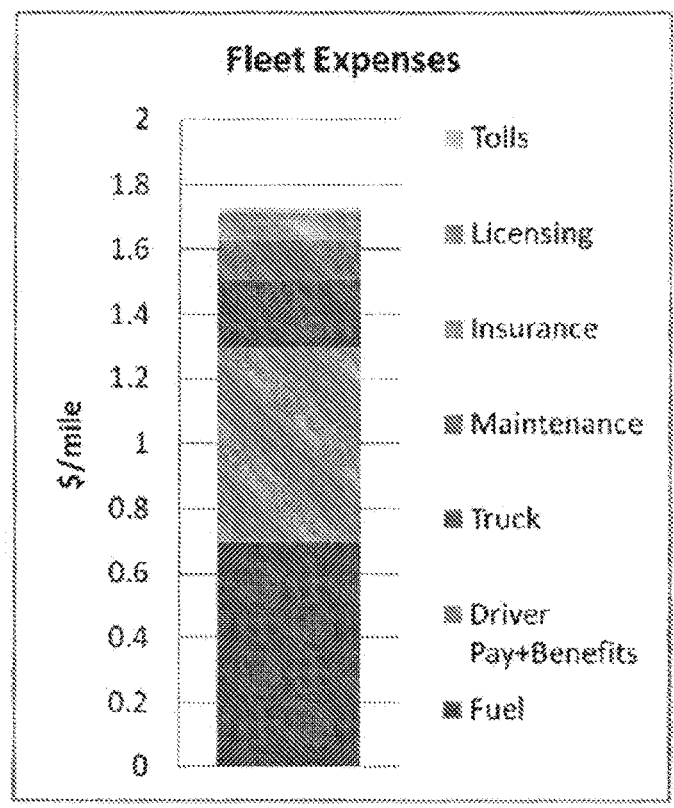
FIG. 3A shows typical fleet expenses for a heavy truck fleet.
Figure 3B:
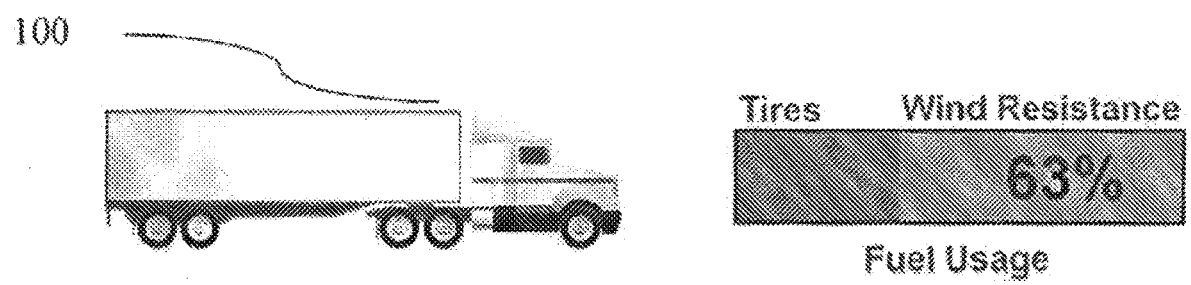
FIG. 3B shows typical heavy truck fuel use contribution from wind resistance (aerodynamic drag).

To facilitate discussion, FIG. 1 shows the airflow around a typical truck 100. This system is aimed at reducing the drag caused by this type of airflow. This drag causes the majority of fuel used in transportation, especially in the Heavy Truck sector (see FIG. 2). The expense of this fuel is significant for all private and industrial vehicle users, but especially so for heavy truck fleets, where the fuel is about 40% of operating expenses (see FIG. 3A). As shown in FIG. 3B, the wind resistance for a typical truck 100 is approximately 63% of engine power at highway speeds. This wind resistance power is approximately proportional to vehicle speed, as Drag_Power=Cd*(Area*0.5*density*Velocity^3), where Cd is the coefficient of drag and is a function of the object's shape.

Figure 4:
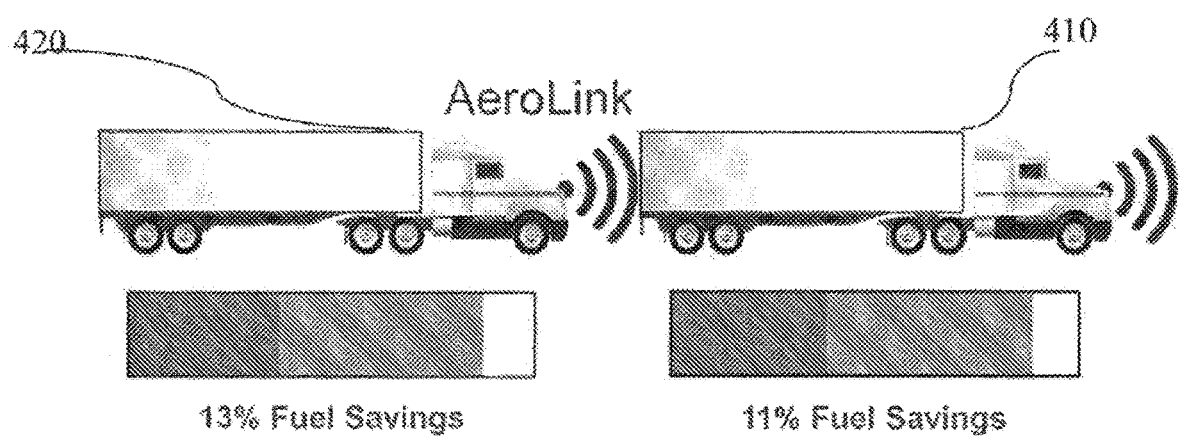
FIG. 4 shows typical fuel savings for a set of linked trucks.
Figure 5:
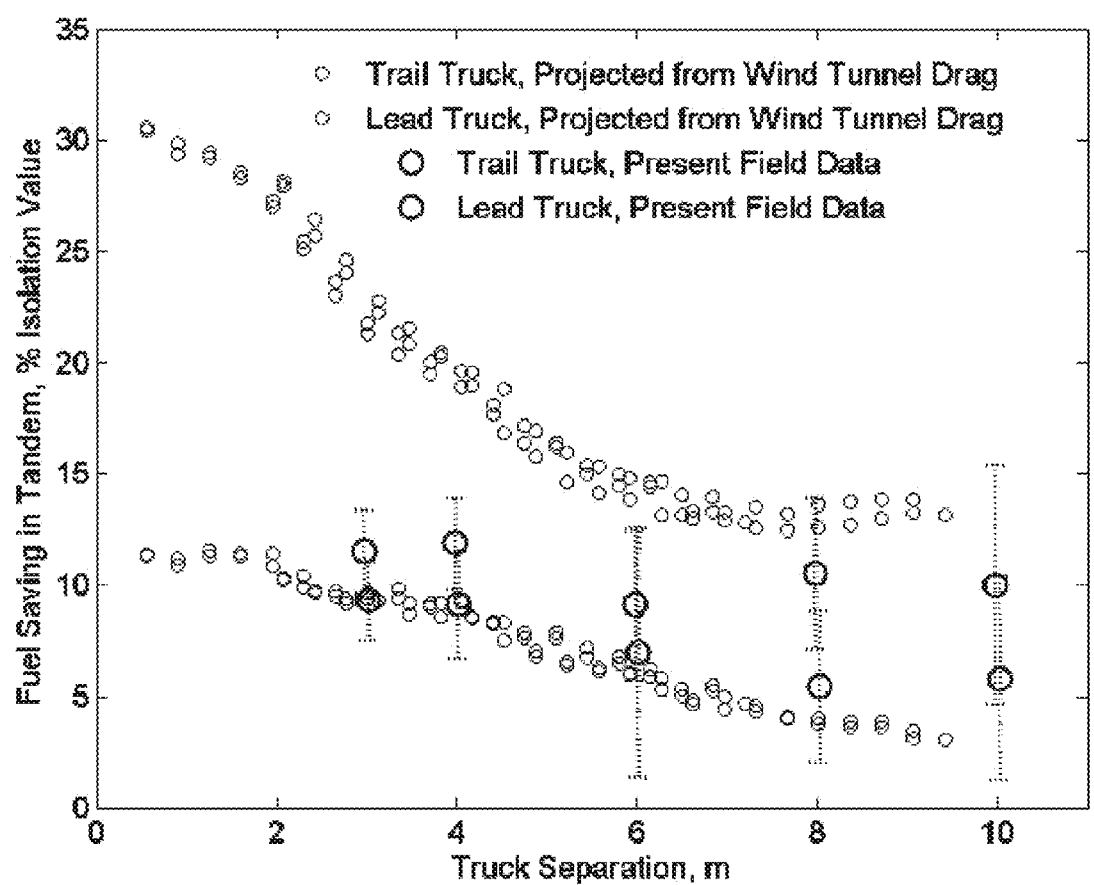
FIG. 5 shows fuel savings versus following distance gap for a set of heavy trucks.

Embodiments of the present invention enable vehicles to follow closely together. FIG. 5 (from "Development and Evaluation of Selected Mobility Applications for VII (a.k.a. IntelliDrive)", Shladover 2009) shows the fuel savings possible for heavy trucks at various gaps, while FIG. 4 shows one specific example of heavy trucks following closely.

Figure 6:
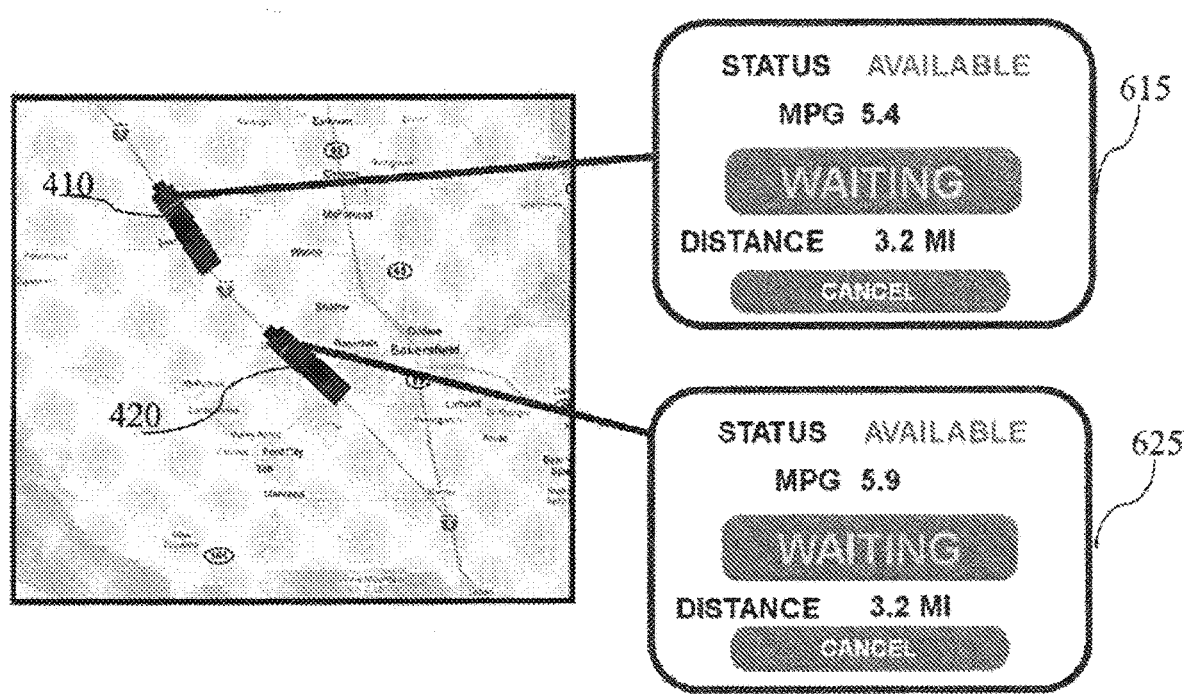
FIG. 6 shows an example of long range coordination functionality between two trucks in accordance with one embodiment of the present invention.

In accordance with the present invention, a key part of the functionality of one such embodiment is long range coordination between the vehicles. Shown in FIG. 6, this serves to allow vehicles 410 and 420 to find linking partners. The system has some knowledge of the location and/or destination of the self-vehicle and of other equipped vehicles on the road. The system can thus suggest nearby vehicles with which to link.

Figure 8:
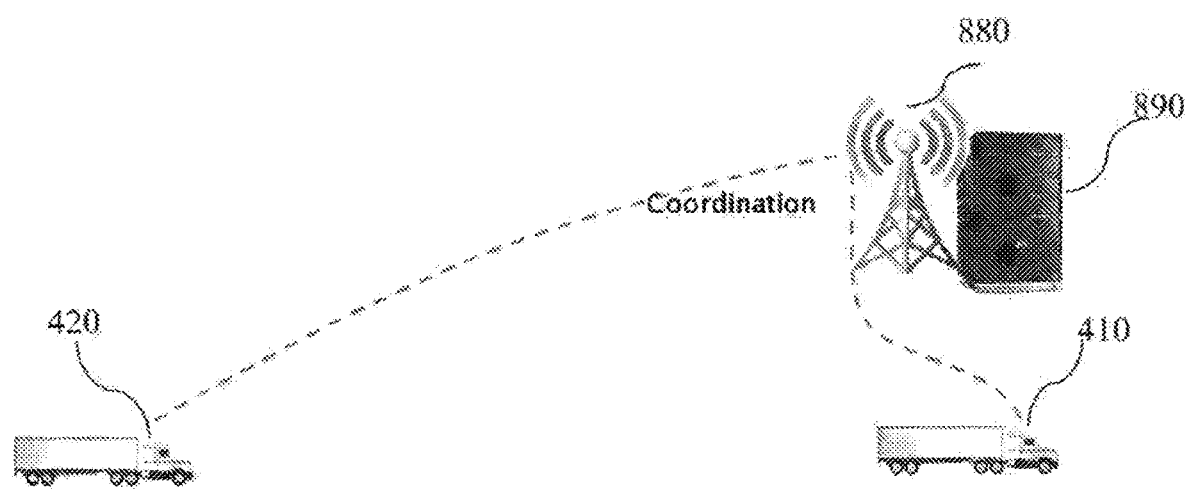
FIG. 8 illustrates an exemplary long range coordination system for long range communications between trucks.

FIG. 8 shows the technology to enable such a system: a long range communication system 880 and a central server 890. The server 890 and/or the system onboard each vehicle makes decisions and suggestions based on knowledge of one or more of vehicle location, destination, load, weather, traffic conditions, vehicle type, trailer type, recent history of linking, fuel price, driver history, or others. When a linking opportunity presents itself, the driver is notified, and can manually adjust his speed to reduce the distance between the vehicles, or the system can automatically adjust the speed.

These linking opportunities can also be determined while the vehicle is stationary, such as at a truck stop, rest stop, weigh station, warehouse, depot, etc. They can also be calculated ahead of time by the fleet manager. They may be scheduled at time of departure, or hours or days ahead of time, or may be found ad-hoc while on the road, with or without the assistance of the coordination functionality of the system.

The determination of which vehicle to suggest may take into account several factors, and choose an optimum such as the vehicle which minimizes a cost function. For example, it may minimize a weighted cost function of the distance between the vehicles and the distance between their destinations: Optimum=min($W_p(Pos_a-Pos_b)^2+W_d(Des_a-Des_b)^2$), where $W_p$ and $W_d$ are the weights on the two cost terms respectively. This cost function could have any of the factors listed above.

Once the two vehicles have decided to coordinate, they may manually adjust their speed, or it may be automatic. If manual, the system may suggest to the leader to slow down, and to the follower to speed up. Or if the leader is stationary (at a truck stop, rest stop, etc.), it may suggest that he delay his departure the appropriate amount of time. These suggestions may be based on vehicle speed, destination, driver history, or other factors. If the system automatically controls the speed, it may operate the truck in a Cruise Control or Adaptive Cruise Control type mode, with the speed chosen to bring the two vehicles closer together. The system may also operate in a semi-automatic mode, where it limits the speed of the leading vehicle, to bring them closer together.

Figure 7:
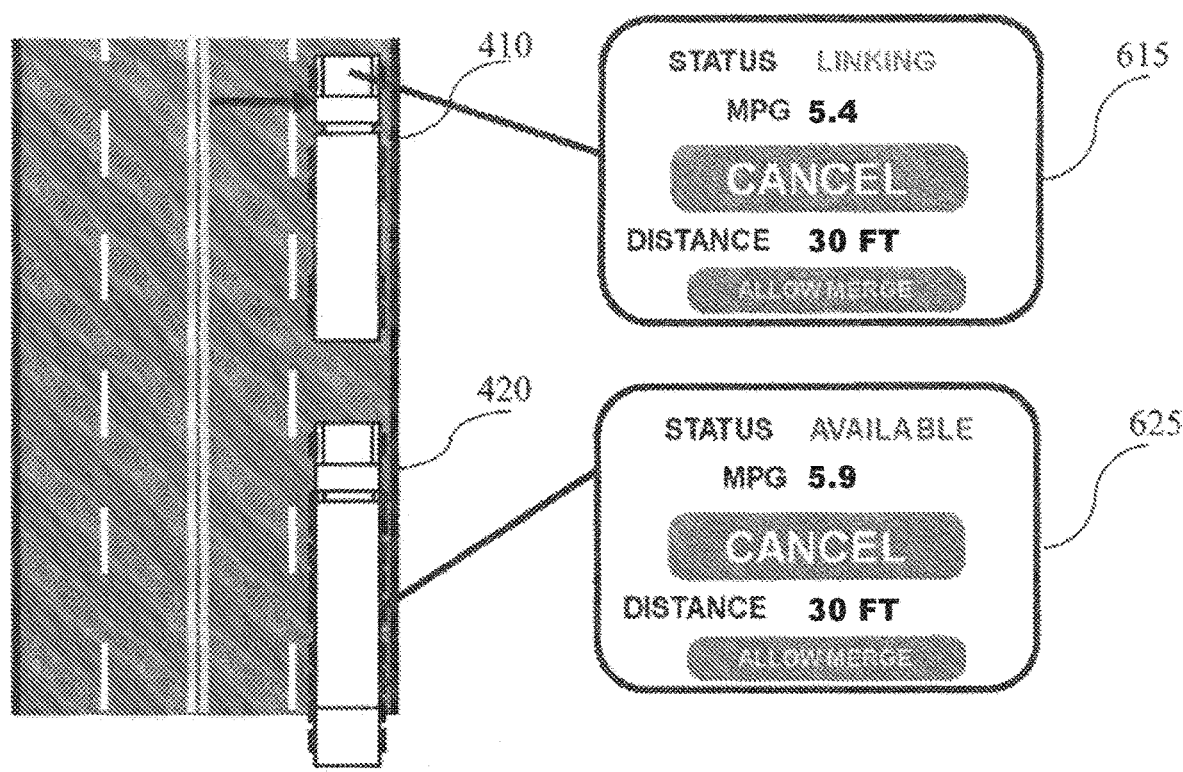
FIG. 7 shows an example of short range linking functionality between two trucks.
Figure 9:
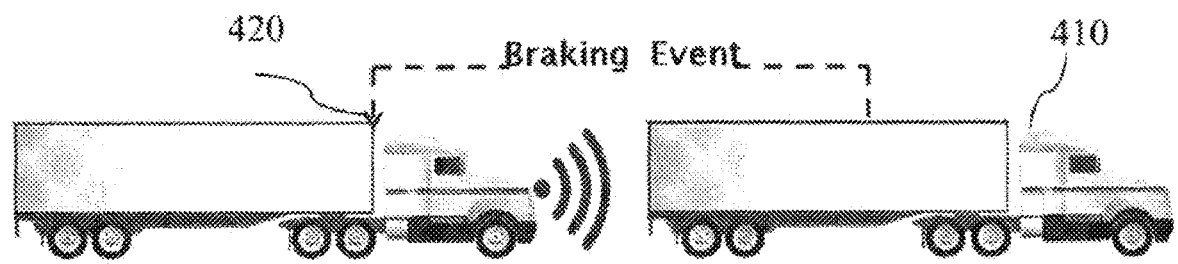
FIG. 9 illustrates exemplary short range communications between trucks.
Figure 10:
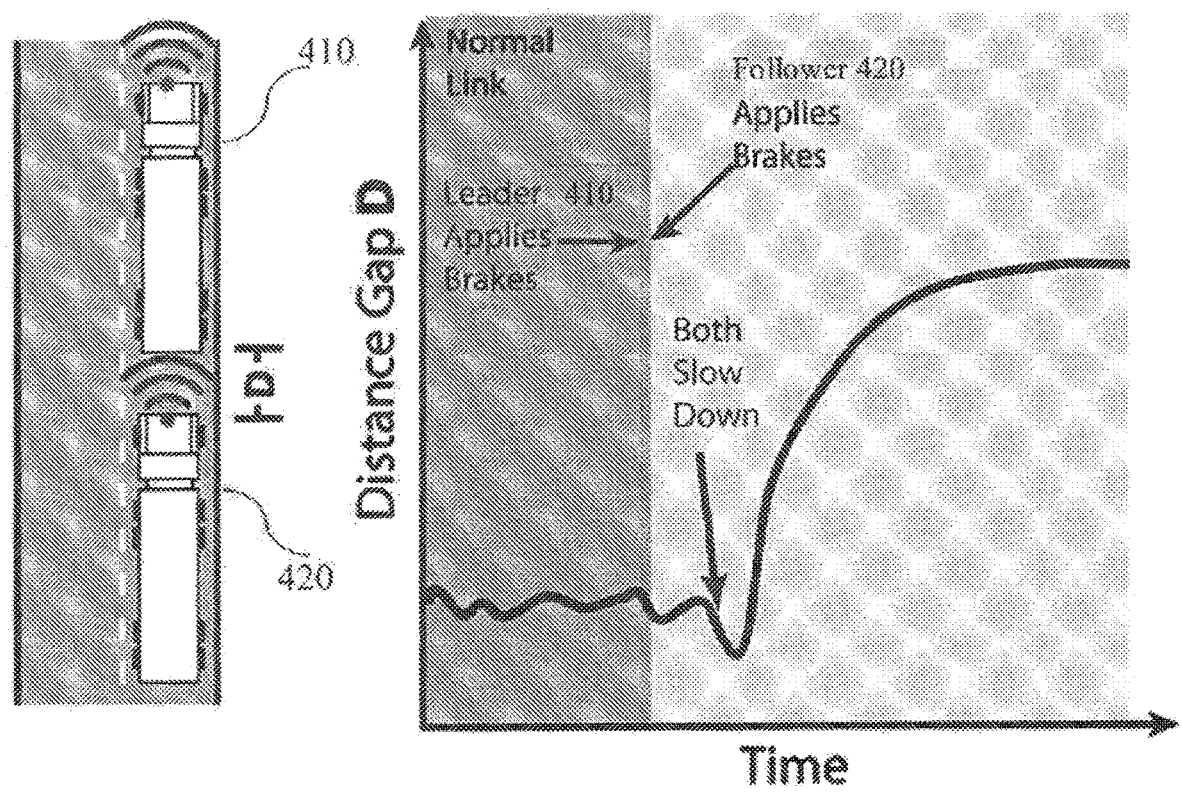
FIG. 10 illustrates an exemplary purpose and utility behind the short range communications between trucks.

Once the vehicles are close together, the system takes control of the rear vehicle 420 and controls it to a close following distance behind the front vehicle 410 (FIG. 7). The driver may use an input of the system (such as the GUI) to activate this transition, or it can be automatic based upon distance between the two vehicles. The key technology to allow this link is shown in FIG. 9, consisting primarily of a distance/relative speed sensor, and a communication link. The type of functionality of this link is shown in FIG. 10, where information about a braking event is sent from the front vehicle 410 to the rear vehicle 420. Other information may include accelerometer data (filtered or unfiltered), tire pressure, information about obstacles or other vehicles in front of the lead truck. Also, any of the above data may be passed from the front truck 410 to the rear truck 420 that relates to trucks in front of the pair (for example, to allow safe platoons of 3 or more trucks). During the close-following mode, the system controls the engine torque and braking, with no driver intervention required. The driver is still steering the vehicle.

The linking event may consist of a smooth transition to the close distance following. This may take the form of a smooth target trajectory, with a controller that tries to follow this trajectory. Using Dm as the safe relative distance in manual mode, and Da as the desired distance in semi-autonomous following mode, and a time Tt for the transition to occur, the target distance may be $D_g = D_m + (D_a - D_m)*(1 - \cos(\pi*t/T_d))/2$ for t less than or equal to $T_d$. Thus in this way the change in gap per time is smallest at the beginning and the end of the transition, and largest in the middle, providing a smooth response. Other possible forms of this equation include exponentials, quadratics or higher powers, hyperbolic trigonometric functions, or a linear change. This shape may also be calculated dynamically, changing while the maneuver is performed based on changing conditions or other inputs.

The driver may deactivate the system in several ways. Application of the brake pedal may resume normal control, or may trigger a mode where the driver's braking is simply added to the system's braking. Applying the accelerator pedal may deactivate the system, returning to a manual mode. Other driver inputs that may trigger a system deactivation include: Turn signal application, steering inputs larger or faster than a threshold, clutch pedal application, a gear change, Jake (compression) brake application, trailer brake application, ignition key-off, and others. The driver can also deactivate the system by selecting an option on the GUI screen or other input device.

In the event of any system malfunction, including but not limited to component failures, software failures, mechanical damage, etc., the system may react in one of several safe ways. In general the trailing truck will start braking to ensure a safe gap is maintained. This braking may continue until the trailing truck has come to a complete stop, or it may continue only until a nominally safe distance is achieved (safe without automated control), or it may continue only until the malfunction has been identified. Additionally, one of several alerts may be used to notify the driver of the malfunction and subsequent action of the control system: a braking jerk, consisting of a small braking command, an audible tone, a seat vibration, a display on the GUI or other display, flashing the instrument cluster or other interior lights, increasing or decreasing engine torque momentarily, activation of the "Jake" (compression) brake, or other useful alerts.

Figure 11:
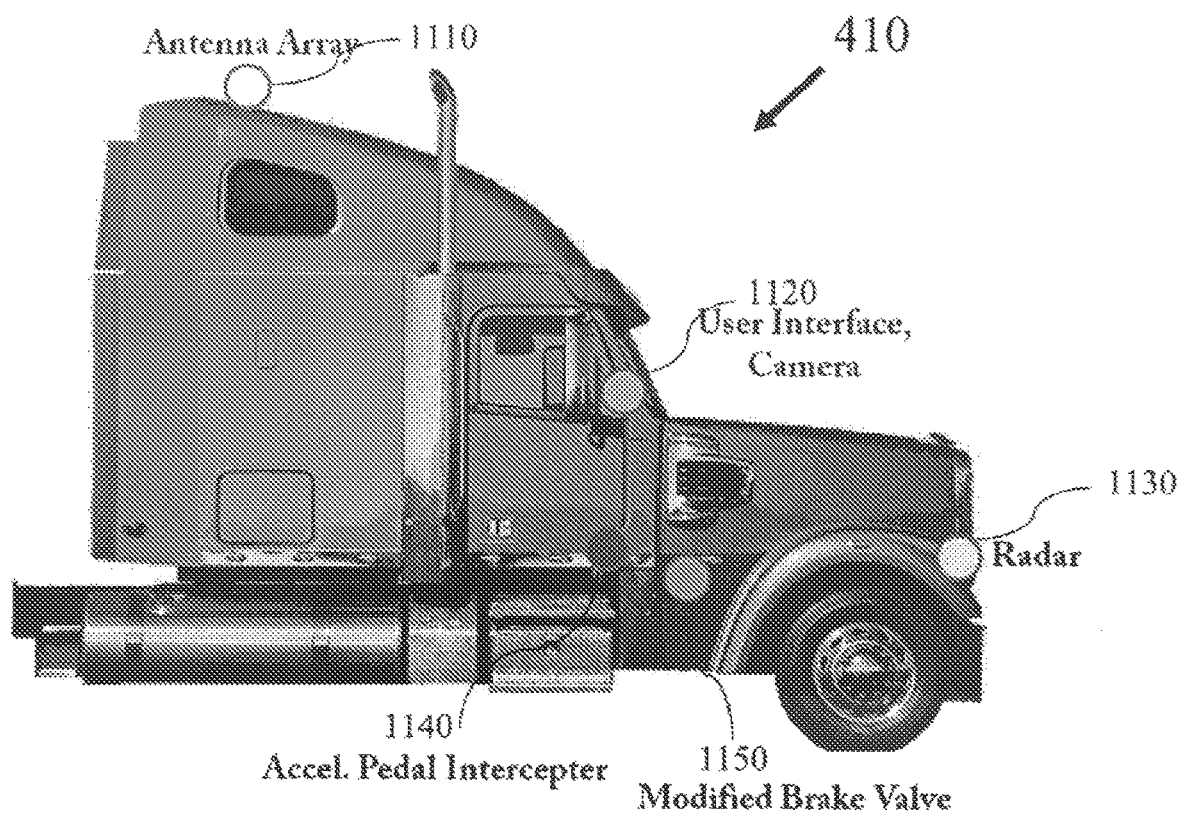
FIG. 11 shows an exemplary installation of system components for one embodiment of the invention.

To enable some or all of the described functionality, the system may have some or all of the following components shown in FIG. 11: An accelerator pedal interceptor 1140, either on the vehicle bus or as a set of analog voltages, to be used to command torque from the engine. A modified brake valve 1150, which allows the system to command braking even in the absence of driver command. A forward-looking RADAR or LIDAR unit 1130, which senses distance and relative speed of the vehicle in front 410. A dash mounted user interface 1120, which may also house a forward looking camera, which is used for the driver to interact with and control the system. An antenna array 1110, used for the short and long range communication systems, and for a GPS receiver.

Figure 12:
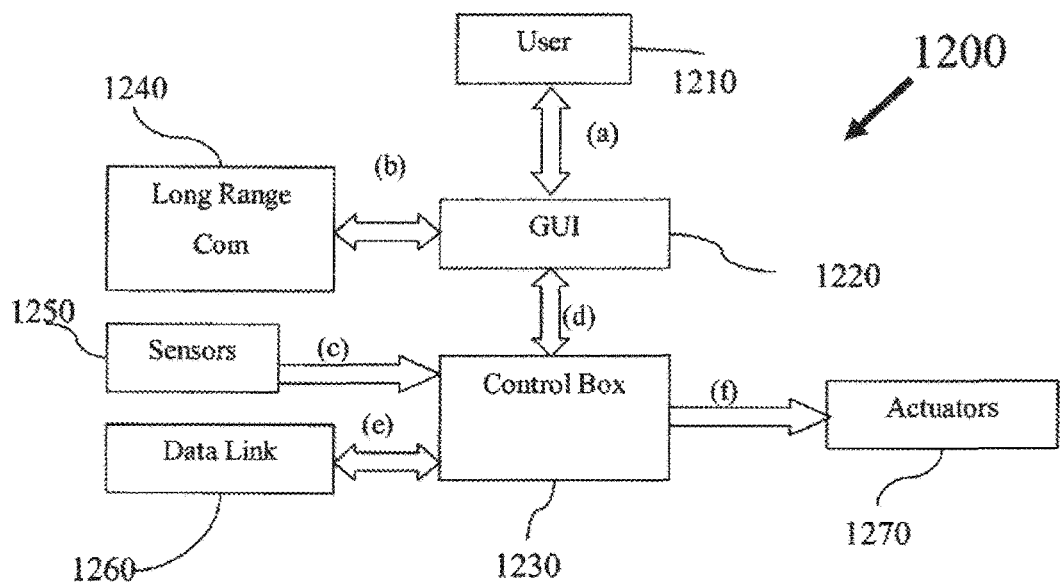
FIG. 12 is a simplified system block diagram illustrating one embodiment of the vehicular convoying control system in accordance with an embodiment of the present invention.

FIG. 12 shows the system architecture for one embodiment 1200. The user 1210 interacts with the system through a Graphical User Interface box 1220 (which may alternatively be integrated with the control box 1230). The user 1210 receives information (a) from visual and or auditory alerts, and can make system requests (e.g., for linking or coordination). The GUI box 1220 communicates with a long range data link 1240 (b). The GUI box 1220 is responsible for managing this data link, sending data via the link, and receiving data via the link. A control box 1230 (which may be alternatively integrated with the GUI box) receives sensor information 1250 (c), short range data link 1260 information (e), and controls the actuators 1270 (f). It receives information from the GUI 1220 via a wired or wireless link (d), and sends information to the GUI 1220 to be relayed to the driver and/or long range communication link 1240. Alternately, the long range communication link 1240 may connect to the control box 1230. In this case, the GUI box 1220 may be an extremely simple (low cost) device, or may even be eliminated from the system entirely.

Figure 13:
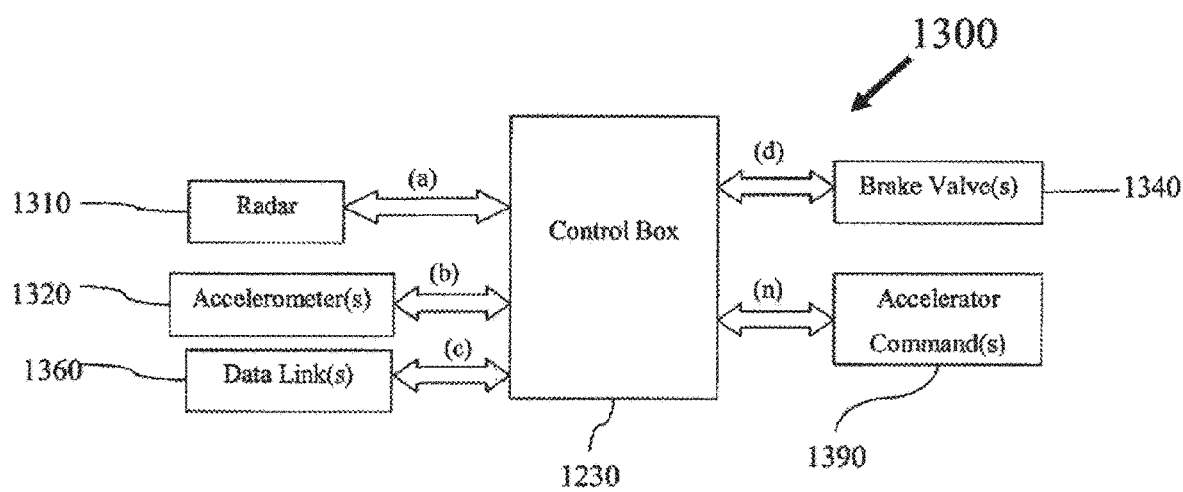
FIG. 13 is a control box block diagram illustrating one embodiment of the vehicular convoying control system in accordance with an embodiment of the present invention.

FIG. 13 shows one embodiment of the Control Box 1230, with the core sensors and actuators. Via connection (a), typically a CAN interface, the control box 1230 configures the radar unit 1310 and receives data. Connection (b) gives the control box acceleration information in 2 or 3 axes. The data link (c) provides information about a leading truck's 410 acceleration, or is used to provide that same information to a following truck 420. The brake valve 1340 (d) provides data on brake pressure, and is used to apply pressure via a command from the control box 1230. The accelerator command 1390 is sent via an analog voltage or a communications signal (CAN or otherwise). The control box performs calculations to process the sensor information, information from the GUI, and any other data sources, and determine the correct set of actuator commands to attain the current goal (example: maintaining a constant following distance to the preceding vehicle).

Figure 15:
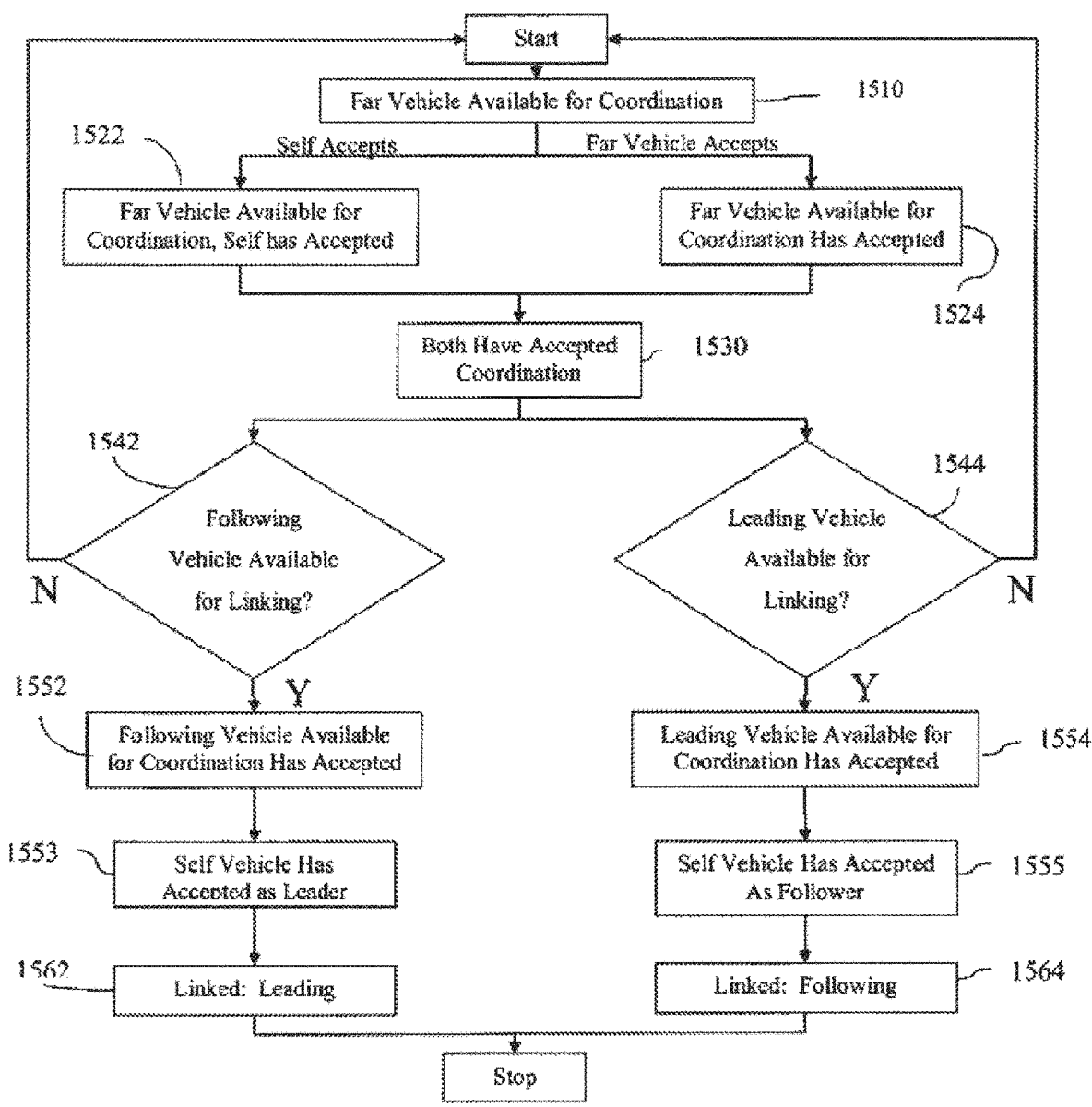
FIG. 15 shows an exemplary flowchart for coordination and linking functionality.

FIG. 15 shows one embodiment of the coordination and linking functionality. First the system identifies a vehicle available for coordination 1510 (example: within a certain range, depending on the route of the two vehicles). Once one of the vehicles has accepted 1522 or 1524, the other can then accept, meaning that the pair has agreed to coordinate for possible linking 1530. Depending on vehicle positioning, weight of load, vehicle equipment, and other factors, a vehicle within linking range may be identified as a Following Vehicle Available for Linking 1542 or a Leading Vehicle Available for Linking 1544. If neither of these is the case, the system returns to coordination mode. Once a Following Vehicle Available for Coordination has Accepted the link 1552, the Self Vehicle then also accept the link 1553, initiating the link. Upon completion of the link the vehicles are now linked 1562. Similarly, once a Leading Vehicle Available for Coordination has Accepted the link 1554, the Self Vehicle then also accept the link 1555, initiating the link. Upon completion of the link the vehicles are now linked 1564.

Safety in the event of emergency maneuvers by the leading vehicle 410 is ensured by the use of the communication link between the two vehicles. This link may send some or all of the following: brake application pressure, brake air supply reservoir pressure, engine torque, engine RPM, compression (Jake) brake application, accelerator pedal position, engine manifold pressure, computed delivered torque, vehicle speed, system faults, battery voltage, and radar/lidar data.

The data link 1260 has very low latency (approximately 10 ms in one embodiment), and high reliability. This could be, but is not limited to, WiFi, radio modem, Zigbee, or other industry standard format. This link could also be a non-industry-standard format. In the event of a data link loss, the trailing vehicles should immediately start slowing, to ensure that if the front vehicle happens to brake immediately when the link is lost, the gap can be maintained safely.

In addition to safe operation during the loss of the data link 1260, the system should be safe in the event of failure of components of the system. For most failures, the trailing vehicles 420 start braking, until the driver takes control. This ensures that in the worst case where the front vehicle 410 starts to brake immediately when a system component fails, the system is still safe. The modified brake valve 1340 is also designed such that in the event of a complete failure, the driver can still brake the vehicle.

Ordering of the vehicles: The system arranges the vehicles on the road to ensure safety. This order may be determined by vehicle weight/load, weather/road conditions, fuel savings or linking time accrued, braking technology on the vehicle, destination or other factors. The system will (graphically or otherwise) tell the drivers which vehicle should be in the front. For example, to mitigate fatigue, the system may cause the trucks to exchange positions on a periodic basis.

Figure 16:
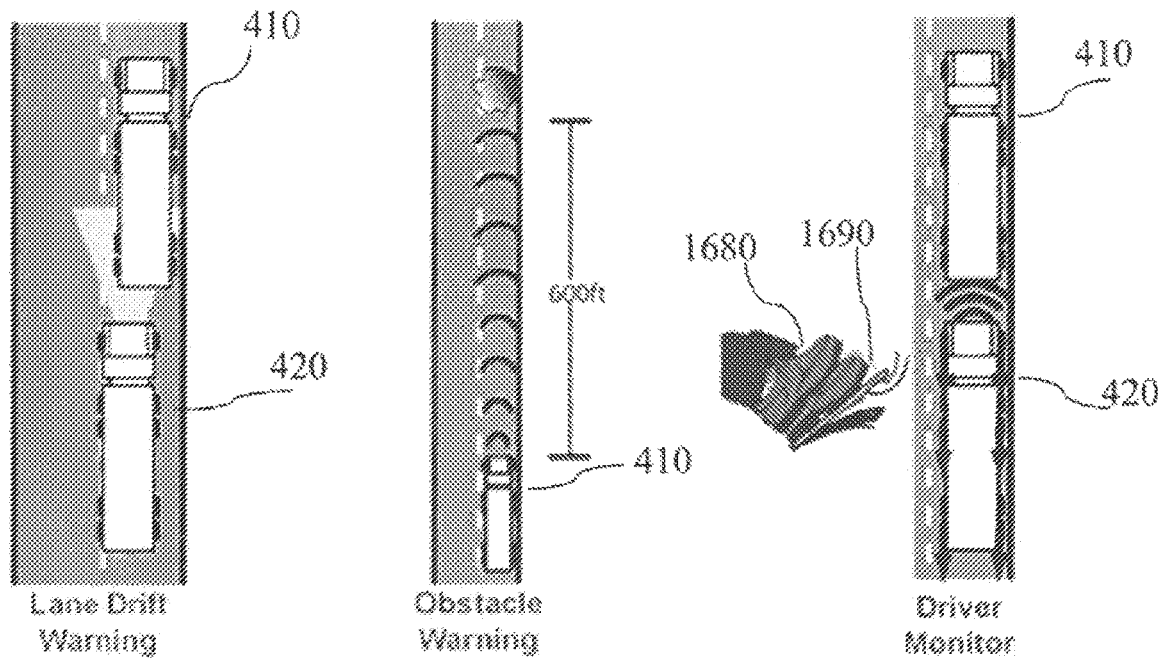
FIG. 16 shows some additional safety features for some embodiments.

FIG. 16 shows some additional safety features the system may have to prevent other types of accidents unrelated to the close following mode. One such feature is to use the video stream from the front looking camera to detect drifting within or out of the lane. This is done by looking at the edges or important features on the leading vehicle 410, and calculating the lateral offset from that vehicle. When it is detected, the system can react with a braking jerk (a short braking application to get the driver's attention), slowing down, or a braking jerk in the leading vehicle. The system can also use the front mounted radar to detect obstacles or stationary vehicles in the road, even when not in close-following mode. When these are detected, it can apply a braking jerk, slow the vehicle, or provide visual or auditory warnings. The system can also use the accelerator pedal signal to determine when the driver is not engaged with the vehicle (or other driver states) and react accordingly, such as slowing the vehicle or disabling the system.

Figure 14:
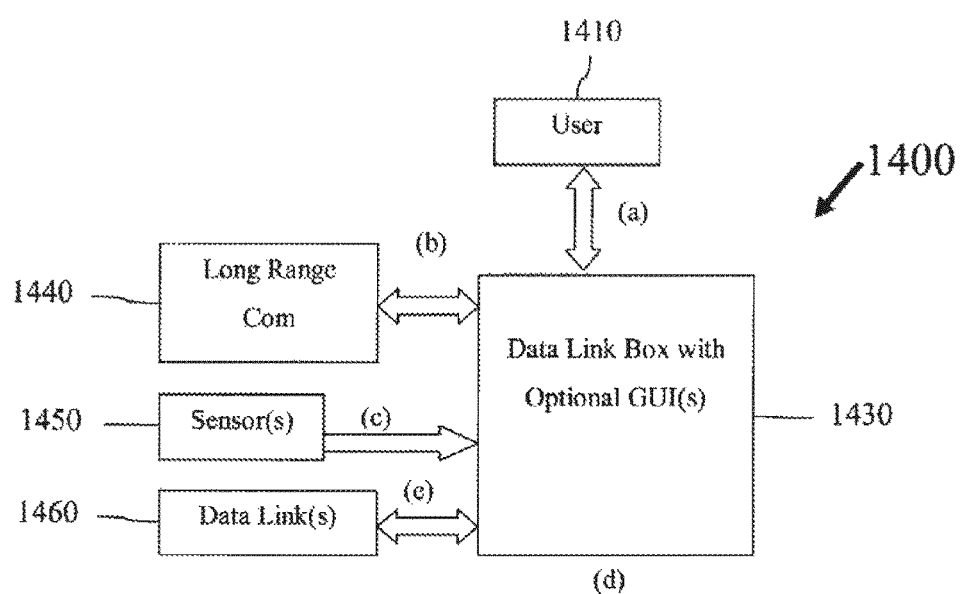
FIG. 14 shows exemplary components for a simplified version of system of the embodiment of FIG. 12 suitable for a lead vehicle.

To facilitate rapid deployment, a simpler version of the system enables vehicles to be a leading vehicle, shown in FIG. 14. The components on this version are a subset of those on the full system, so there is no automation. There are several embodiments of this reduced set of functionality, with different subsets of the components from the full system. One minimal system simply performs two functions: transmits sufficient data to the trailing vehicle to allow close following, and alerts the front driver to a linking request and allows him/her to accept or decline it. As such, this version has only the data link functionality 1460. It connects to the brake pressure sensor and electrical power. This system may also have additional components, including an accelerometer 1450 and/or an extremely simple user interface and/or long range data communication 1440.

The full system may also provide other fuel economy optimizations. These may include grade-based cruise control, where the speed set-point is determined in part by the grade angle of the road and the upcoming road. The system can also set the speed of the vehicles to attain a specific fuel economy, given constraints on arrival time. Displaying the optimum transmission gear for the driver 1410 can also provide fuel economy benefits.

The system may also suggest an optimal lateral positioning of the trucks, to increase the fuel savings. For example, with a cross wind, it may be preferable to have a slight offset between the trucks, such that the trailing truck is not aligned perfectly behind the leading truck. This lateral position may be some combination of a relative position to the surrounding truck(s) or other vehicles, position within the lane, and global position.

The data link between the two vehicles is critical to safety, so the safety critical data on this link has priority over any other data. Thus the link can be separated into a safety layer (top priority) and a convenience layer (lower priority). The critical priority data is that which is used to actively control the trailing vehicle. Examples of this may include acceleration information, braking information, system activation/deactivation, system faults, range or relative speed, or other data streams related to vehicle control.

The lower priority convenience portion of the link can be used to provide data to the driver to increase his pleasure of driving. This can include social interaction with the other drivers, video from the front vehicle's camera to provide a view of the road ahead. This link can also be used when the vehicle is stationary to output diagnostic information gathered while the vehicle was driving.

Because the system is tracking the movements of the vehicles, a tremendous amount of data about the fleet is available. This information can be processed to provide analysis of fleet logistics, individual driver performance, vehicle performance or fuel economy, backhaul opportunities, or others.

The system will have an "allow to merge" button to be used when the driver wants another vehicle to be able to merge in between the two vehicles. The button will trigger an increase in the vehicle gap to a normal following distance, followed by an automatic resumption of the close following distance once the merging vehicle has left. The length of this gap may be determined by the speed of the vehicles, the current gap, an identification of the vehicle that wishes to merge, the road type, and other factors. The transition to and from this gap may have a smooth shape similar to that used for the original linking event. Using Dv as the relative distance to allow a vehicle to cut in, and Da as the desired distance in semi-autonomous following mode, and a time Tt for the transition to occur, the target distance may be $D_g = D_a + (D_v - D_a) * (1 - \cos(pi * t / T_d))/2$ for t less than or equal to $T_d$.

For vehicles with an automatic transmission, the system can sense the application of the clutch pedal by inferring such from the engine speed and vehicle speed. If the ratio is not close to one of the transmission ratios of the vehicle, then the clutch pedal is applied or the vehicle is in neutral. In this event the system should be disengaged, because the system no longer has the ability to control torque to the drive wheels. For example this calculation may be performed as a series of binary checks, one for each gear: Gear_1=abs (RPM/WheelSpeed−Gear1Ratio)<Gear1Threshold and so on for each gear. Thus if none of these are true, the clutch pedal is engaged.

The system can estimate the mass of the vehicle to take into account changes in load from cargo. The system uses the engine torque and measured acceleration to estimate the mass. In simplest form, this says that M_total=Force_Wheels/Acceleration. This may also be combined with various smoothing algorithms to reject noise, including Kalman filtering, Luenberger observers, and others. This estimate is then used in the control of the vehicle for the trajectory generation, system fail-safes, the tracking controller, and to decide when full braking power is needed. The mass is also used to help determine the order of the vehicles on the road.

Many modifications and additions to the embodiments described above are possible and are within the scope of the present invention. For example, the system may also include the capability to have passenger cars or light trucks following heavy trucks. This capability may be built in at the factory to the passenger cars and light trucks, or could be a subset of the components and functionality described here, e.g., as an aftermarket product.

Figure 17:
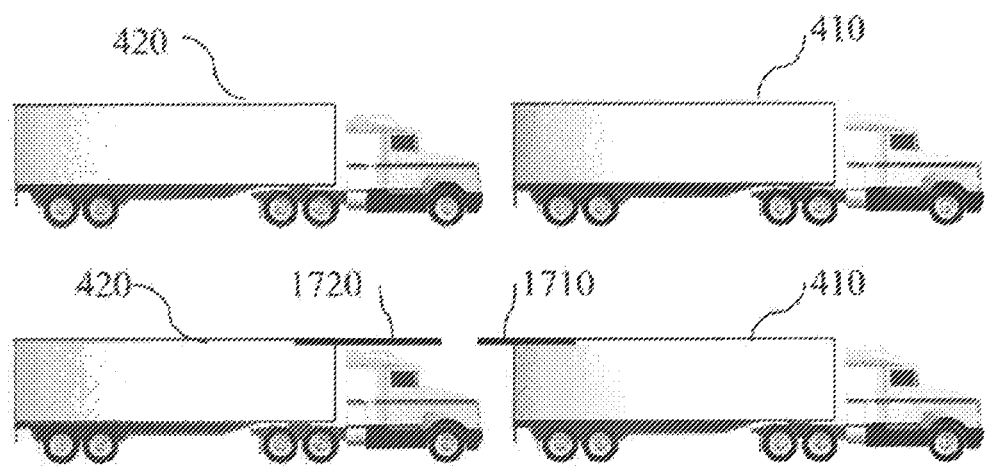
FIG. 17 shows one exemplary embodiment of simplified aerodynamic optimization for use with convoying vehicles.

The system may also include an aerodynamic design optimized for the purpose of convoying, as shown in FIG. 17. This may be the design of the tractor or trailer, or the design of add-on aerodynamic aids that optimize the airflow for the convoy mode. This design may correspond to a specific speed, at which the airflow will be optimized for the convoy mode.

For example, a hood may deploy, e.g., slide forward, from the roof of the follower vehicle. Portions of the hood may be textured (like an aerodynamic golf ball surface) or may be transparent so as not to further obscure the follower driver's view. In another example, the existing aerodynamic cone of a follower truck may be repositioned, and/or the cone profile dynamically reconfigured, depending on vehicular speed and weather conditions. This aerodynamic addition or modification may be on the top, bottom, sides, front, or back of the trailer or tractor, or a combination thereof.

This aerodynamic design may be to specifically function as a lead vehicle 1710, specifically as a following vehicle 1720, or an optimized combination of the two. It may also be adjustable in some way, either automatically or manually, to convert between optimized configurations to be a lead vehicle, a following vehicle, both, or to be optimized for solitary travel.

The data link between the two vehicles may be accomplished in one of several ways, including, but not limited to: a standard patch antenna, a fixed directional antenna, a steerable phased-array antenna, an under-tractor antenna, an optical link from the tractor, an optical link using one or more brake lights as sender or receiver, or others.

The data link, or other components of the system, may be able to activate the brake lights, in the presence or absence of brake pedal or brake application.

Other possible modifications include supplemental visual aids for drivers of follower vehicles, including optical devices such as mirrors and periscopes, to enable follower drivers to get a better forward-looking view, which is partially obscured by the lead vehicle.

Any portion of the above-described components included in the system may be in the cab, in the trailer, in each trailer of a multi-trailer configuration, or a combination of these locations.

The components may be provided as an add-on system to an existing truck, or some or all of them may be included from the factory. Some of the components may also be from existing systems already installed in the truck from the factory or as an aftermarket system.

The present invention is also intended to be applicable to current and future vehicular types and power sources. For example, the present invention is suitable for 2-wheeler, 3-wheelers, 4 wheelers, 16-wheelers, gas powered, diesel powered, two-stroke, four-stroke, turbine, electric, hybrid, and any combinations thereof. The present invention is also consistent with many innovative vehicular technologies such as hands-free user interfaces including head-up displays, speech recognition and speech synthesis, regenerative braking and multiple-axle steering.

The system may also be combined with other vehicle control systems such as Electronic Stability Control, Parking Assistance, Blind Spot Detection, Adaptive Cruise Control, Traffic Jam Assistance, Navigation, Grade-Aware Cruise Control, Automated Emergency Braking, Pedestrian detection, Rollover-Control, Anti-Jackknife control, Anti-Lock braking, Traction Control, Lane Departure Warning, Lane-keeping Assistance, and Sidewind compensation. It may also be combined with predictive engine control, using the command from the system to optimize future engine inputs.

In sum, the present invention provides systems and methods for Semi-Autonomous Vehicular Convoying. The advantages of such a system include the ability to follow closely together in a safe, efficient, convenient manner.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for convoying vehicles, comprising:
receiving, by a computerized controller on a first vehicle from among a plurality of vehicles, information about a second vehicle from among the plurality of vehicles via a communication link between the first vehicle and the second vehicle, wherein:
the communication link comprises a first communication layer operable to transmit safety critical data but not video, and a second communication layer operable to transmit video but not safety critical data;
receiving, via the second communication layer, video captured at a camera located in the first vehicle to the second vehicle;
receiving, by the computerized controller on the first vehicle and via the first communication layer, commands capable of causing the actuation of brakes at the first vehicle, wherein the received commands are received from the second vehicle;
receiving, by the computerized controller on the first vehicle, information from a sensor system regarding a gap distance between the first vehicle and the second vehicle; and
commanding, by the computerized controller on the first vehicle and via the first communication layer, engine torque of the first vehicle to maintain the gap distance to a predetermined value.

2. The method of claim 1, further comprising:
providing a display of the video to the driver of the first vehicle.

3. The method of claim 1, wherein the video from the camera includes video including a forward-looking view from the second vehicle.

4. The method of claim 1, further comprising:
commanding, by the computerized controller on the first vehicle, braking of the first vehicle to maintain the gap distance to a predetermined value.

5. The method of claim 1, wherein the first vehicle is positioned to follow behind the second vehicle.

6. The method of claim 1:
wherein the video represents an amount of vehicle lane drift;

further comprising calculating a vehicle lateral offset based on the vehicle lane drift; and further comprising sending, upon detecting an amount of vehicle lateral offset, the commands capable of causing the actuation of brakes, wherein the commands include a braking jerk command.

7. The method of claim 1, wherein the communication link is configured such that:
the first communication layer is used to communicate information about the second vehicle selected from the group consisting of acceleration information, braking information, convoying system activation, convoying system deactivation, convoying system faults, second vehicle distance from the first vehicle, second vehicle speed relative to the first vehicle, one or more data streams used to control the second vehicle, brake application pressure, brake air supply reservoir pressure, engine torque, engine revolutions per minute (RPM), compression brake application, accelerator pedal position, engine manifold pressure, computed delivered torque, vehicle speed, battery voltage, radar data, lidar data, accelerometer data, and tire pressure.

8. The method of claim 1, wherein the sensor system is attached to the first vehicle, and is selected from the group consisting of:
a radar system and a lidar system.

9. The method of claim 1, wherein the communication link comprises at least a first communication layer and a second communication layer.

10. A system for vehicle convoying, the system comprising:
a first control unit, configured to:
receive information about a second vehicle via a communication link between a first vehicle and the second vehicle, wherein: the communication link comprises a first communication layer operable to transmit safety critical data but not video, and a second communication layer operable to transmit video but not safety critical data;
receive commands capable of causing the actuation of brakes at the first vehicle, wherein the received commands are received from the second vehicle via the first communication layer; and
receive information from a sensor system regarding a gap between the first vehicle and the second vehicle; and
a second control unit, configured to:
receive, via the second communication layer, video captured at a camera located in the first vehicle to the second vehicle; and
command engine torque of the first vehicle to maintain the gap at a predetermined value.

11. The system of claim 10, additionally comprising a video display configured to present the video to the driver of the first vehicle.

12. The system of claim 10, wherein the camera on the second vehicle is a forward-looking camera.

13. The system of claim 10:
wherein the video represents an amount of vehicle lane drift;
further configured to calculate a vehicle lateral offset based on the vehicle lane drift; and
further configured to send, upon detecting an amount of vehicle lateral offset, the commands capable of causing the actuation of brakes, wherein the commands include a braking jerk command.

14. The system of claim 10, wherein the communication link is configured such that:
the first communication layer is used to communicate information about the second vehicle selected from the group consisting of acceleration information, braking information, convoying system activation, convoying system deactivation, convoying system faults, second vehicle distance from the first vehicle, second vehicle speed relative to the first vehicle, one or more data streams used to control the second vehicle, brake application pressure, brake air supply reservoir pressure, engine torque, engine revolutions per minute (RPM), compression brake application, accelerator pedal position, engine manifold pressure, computed delivered torque, vehicle speed, battery voltage, radar data, lidar data, accelerometer data, and tire pressure.

15. The system of claim 10, wherein both the first control unit and the second control unit are on the first vehicle.

16. The method of claim 10, wherein the first vehicle is positioned to follow behind the second vehicle.

17. The method of claim 10, wherein the first vehicle and the second vehicle are both trucks.

18. A method for communicating between a plurality of vehicles, comprising:
receiving, by a computerized controller on a first vehicle from among a plurality of vehicles, information about a second vehicle from among the plurality of vehicles via a communication link between the first vehicle and the second vehicle, wherein:
the communication link comprises a first communication layer operable to transmit safety critical data but not video, and a second communication layer operable to transmit video but not safety critical data, and
information received by the computerized controller on the first vehicle includes information generated at the second vehicle via the first communication layer capable of causing actuation of brakes on the first vehicle, wherein the communication link additionally provides video from a camera located in the second vehicle to the first vehicle via the second communication layer.

19. The method of claim 18, further comprising providing a display of the video to the driver of the first vehicle.

20. The method of claim 18, wherein the video from the camera provides a forward-looking view from the second vehicle.

21. The method of claim 18, wherein the communication link is a wireless radio frequency communication link.

22. The method of claim 21, wherein
the first communication layer further communicates information about the second vehicle selected from the group consisting of acceleration information, braking information, convoying system activation, convoying system deactivation, convoying system faults, second vehicle distance from the first vehicle, second vehicle speed relative to the first vehicle, one or more data streams used to control the second vehicle, brake application pressure, brake air supply reservoir pressure, engine torque, engine revolutions per minute (RPM), compression brake application, accelerator pedal position, engine manifold pressure, computed delivered torque, vehicle speed, battery voltage, radar data, lidar data, accelerometer data, and tire pressure.

23. The method of claim 18, wherein the first vehicle is positioned to follow behind the second vehicle.

24. The method of claim 18:
wherein the video represents an amount of vehicle lane drift;
further comprising calculating a vehicle lateral offset based on the vehicle lane drift; and
further comprising sending, upon detecting an amount of vehicle lateral offset, the commands capable of causing the actuation of brakes, wherein the commands include a braking jerk command.

25. The method of claim 18, wherein the first vehicle and the second vehicle are platooning.

26. A method for distributing video information between vehicles, comprising:
receiving, by a computerized controller on a first vehicle from among a plurality of vehicles, information about a second vehicle from among the plurality of vehicles via a communication link between the first vehicle and the second vehicle, wherein:
the communication link comprises a first communication layer operable to transmit safety critical data but not video, and a second communication layer operable to transmit video but not safety critical data, and information received by the computerized controller on the first vehicle includes information generated at the second vehicle via the first communication layer capable of causing actuation of brakes on the first vehicle, wherein the communication link additionally provides video from a camera located in the second vehicle to the first vehicle via the second communication layer.

27. The method of claim 26, further comprising providing a display of the video to the driver of the first vehicle.

28. The method of claim 26, wherein the video from the camera provides a forward-looking view from the second vehicle.

29. The method of claim 26:
wherein the video represents an amount of vehicle lane drift;
further comprising calculating a vehicle lateral offset based on the vehicle lane drift; and
further comprising sending, upon detecting an amount of vehicle lateral offset, the commands capable of causing the actuation of brakes, wherein the commands include a braking jerk command.

* * * * *